(12) United States Patent
Bonsma et al.

(10) Patent No.: US 7,953,875 B2
(45) Date of Patent: May 31, 2011

(54) DISTRIBUTED COMPUTER SYSTEM FOR STORING DATA ITEMS ASSIGNED TO VIRTUAL DIRECTORIES

(75) Inventors: Erwin R Bonsma, Ipswich (GB); Cefn R Hoile, Ipswich (GB)

(73) Assignee: British Telecommunications plc, London (GB)

( * ) Notice: Subject to any disclaimer, the term of this patent is extended or adjusted under 35 U.S.C. 154(b) by 496 days.

(21) Appl. No.: 10/583,964

(22) PCT Filed: Dec. 10, 2004

(86) PCT No.: PCT/GB2004/005212
§ 371 (c)(1), (2), (4) Date: Jun. 21, 2006

(87) PCT Pub. No.: WO2005/057427
PCT Pub. Date: Jun. 23, 2005

(65) Prior Publication Data
US 2006/0285543 A1  Dec. 21, 2006

(30) Foreign Application Priority Data

Dec. 12, 2003 (GB) .................................. 0328888.3

(51) Int. Cl.
*G06F 15/16* (2006.01)
(52) U.S. Cl. ........................................ 709/230
(58) Field of Classification Search .................. 709/206, 709/201, 204, 230
See application file for complete search history.

(56) References Cited

U.S. PATENT DOCUMENTS

| 5,870,734 | A | 2/1999 | Kao |
| 6,553,420 | B1 | 4/2003 | Karger et al. |
| 7,487,509 | B2 * | 2/2009 | Hugly et al. .................. 719/310 |
| 2002/0107982 | A1 | 8/2002 | Teodosiu et al. |
| 2002/0112008 | A1 * | 8/2002 | Christenson et al. ......... 709/206 |
| 2002/0163889 | A1 * | 11/2002 | Yemini et al. ................. 370/238 |
| 2003/0187812 | A1 * | 10/2003 | Theimer et al. ................... 707/1 |

FOREIGN PATENT DOCUMENTS

| EP | 1303096 A2 | 4/2003 |
| WO | WO 03/034669 A1 | 4/2003 |

OTHER PUBLICATIONS

Adar et al; "Free Riding on Gnutella"; 2000; First Monday, vol. 5; pp. 1-22.*
Kwon et al; "An efficient peer-to-peer file sharing exploiting hierarchy and asymmetry"; 2003; Proceedings of the 2003 Symposium on Applications and the Internet; pp. 1-8.*

(Continued)

*Primary Examiner* — Kevin Bates
*Assistant Examiner* — Jeffrey Nickerson
(74) *Attorney, Agent, or Firm* — Nixon & Vanderhye PC

(57) ABSTRACT

Computers store data items, each data item being assigned to one of a plurality of virtual directories. Each computer has at least one node of a virtual network for directory look-up, with linking data including addresses of other nodes associated with the same virtual directory and software that, in response to an enquiry message either replies, identifying itself or forwards the message to another node of the network, according to whether the node is or is not associated with the directory specified in the enquiry message.

20 Claims, 18 Drawing Sheets

OTHER PUBLICATIONS

Marrow et al; "DIET—a scalable, robust, and adaptable multi-agent platform for information management"; Oct. 2003; BT Technology Journal, vol. 21, No. 4; pp. 1-8.*

Zhao et al; "Tapestry: An infrastructure for Fault-tolerant Wide-area location and routing"; Apr. 2001; UC Berkeley Report No. UCB/CSD-01-1141; pp. 1-28.*

Kwon et al; "BYPASS: Topology-aware lookup overlay for DHT-based P2P file locating services"; Jul. 2004; Proceedings of the 10th International Conference on Parallel and Distributed Systems (ICPADS'04); pp. 1-8.*

Stoica et al; "Chord: A scalable peer-to-peer lookup service for Internet applications"; Aug. 2001; SIGCOMM'01 pp. 149-160.*

Triantafillou et al; "Towards high performance peer-to-peer content and resource sharing systems"; Jan. 8, 2003; Proceedings of the 2003 CIDR Conference; pp. 1-12.*

Adya et al; "FARSITE: Federated, Available, and Reliable Storage for an Incompletely Trusted Environment"; 2002; USENIX Association; In Proceedings of the 5th Symposium on Operating Systems Design and Implementation; pp. 1-14.*

Kwon et al; "BYPASS: Topology-Aware Lookup Overlay for DHT-based P2P File Locating Services"; 2004; IEEE; In Proceedings of the Tenth International Conference on Parallel and Distributed Systems; pp. 297-304.*

International Search Report dated Mar. 23, 2005.

GB Search Report dated Mar. 1, 2004.

Ratnasamy et al., "A Scalable Content-Addressable Network", Computer Communication Review, Association for Computing Machinery, New York, US, vol. 31, No. 4, Oct. 2001, pp. 161-172, XP001115754.

Menasce, Scalable P2P Search, Published by the IEEE Computer Society, Mar.-Apr. 2003, IEEE Internet Computing.

Bonsma, "Fully Decentralised, Scalable Look-up in a Network of Peers Using Small World Networks", circa. 2002.

Bonsma et al., "A Distributed Implementation of the SWAN Peer-to-Peer Look-up System Using Mobile Agents", circa. 2002.

* cited by examiner

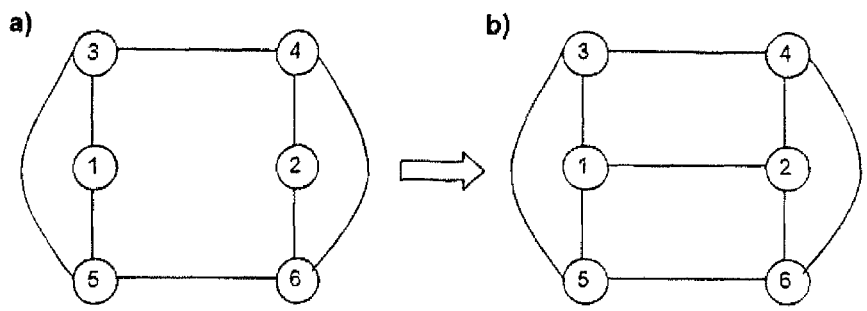

How a new link is created between two nodes (Node 1 and 2) when both nodes can still create a new link. a) The network before Node 1 received a Notify message about Node 2, and b) The network after Node 1 successfully created a new link in response to the Notify message.

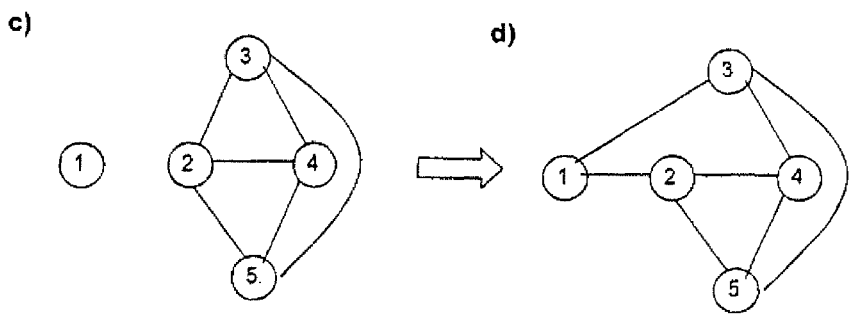

How a node (Node 1) inserts itself in an existing link (between Node 2 and Node 3) because Node 2 already had the maximum number of links. c) The network before Node 1 received a Notify message about Node 2, and d) The network after Node 1 successfully changed an existing link into two new ones in response to the Notify message.

Figure 2

DISTRIBUTED COMPUTER SYSTEM FOR STORING DATA ITEMS ASSIGNED TO VIRTUAL DIRECTORIES

BACKGROUND

Technical Field

The present invention relates to computer networks, and particularly, though not exclusively to information retrieval in the context of distributed systems such as peer-to-peer systems, especially those with no centralised storage or control.

BRIEF DESCRIPTION OF THE DRAWINGS

Some embodiments of the invention will now be described, by way of example, with reference to the accompanying drawings, in which:

FIG. 2 is a schematic diagram showing links between nodes of a virtual network;

DETAILED DESCRIPTION OF EXEMPLARY EMBODIMENTS

Nodes

In this description reference will be made to computing nodes that have processing, storage and communication capabilities. A computing node can be a computer or other device, or—noting that a single computer may have a number of independent programs or processes running on it—may be a such a program or process. An item of stored data may also be regarded as a distinct node, even though a number of such items may be serviced by a single program or process.

This description assumes that each computing node is connected to some communication infrastructure which could for example be a telecommunications network such as an IP (internet protocol) network, so that messages can be sent to it. Thus, each computing node also constitutes a node within the communications infrastructure.

Reference will also be made to virtual nodes which belong to a virtual network. The distinction is important because a computing node is able to have two or more virtual nodes (possibly belonging to different virtual networks) associated with it. As its name implies, a virtual node does not exist in any physical sense: rather, as will become clear presently, its existence is established by stored data which define links between virtual nodes and, hence, also define the virtual network to which it belongs.

Necessarily a virtual node must be associated with a computing node, which provides it with processing, storage and communication capabilities: references to the sending, receiving and processing of messages by a virtual node refer to such sending receiving or processing by the computing node on behalf of the virtual node.

Figure 1:
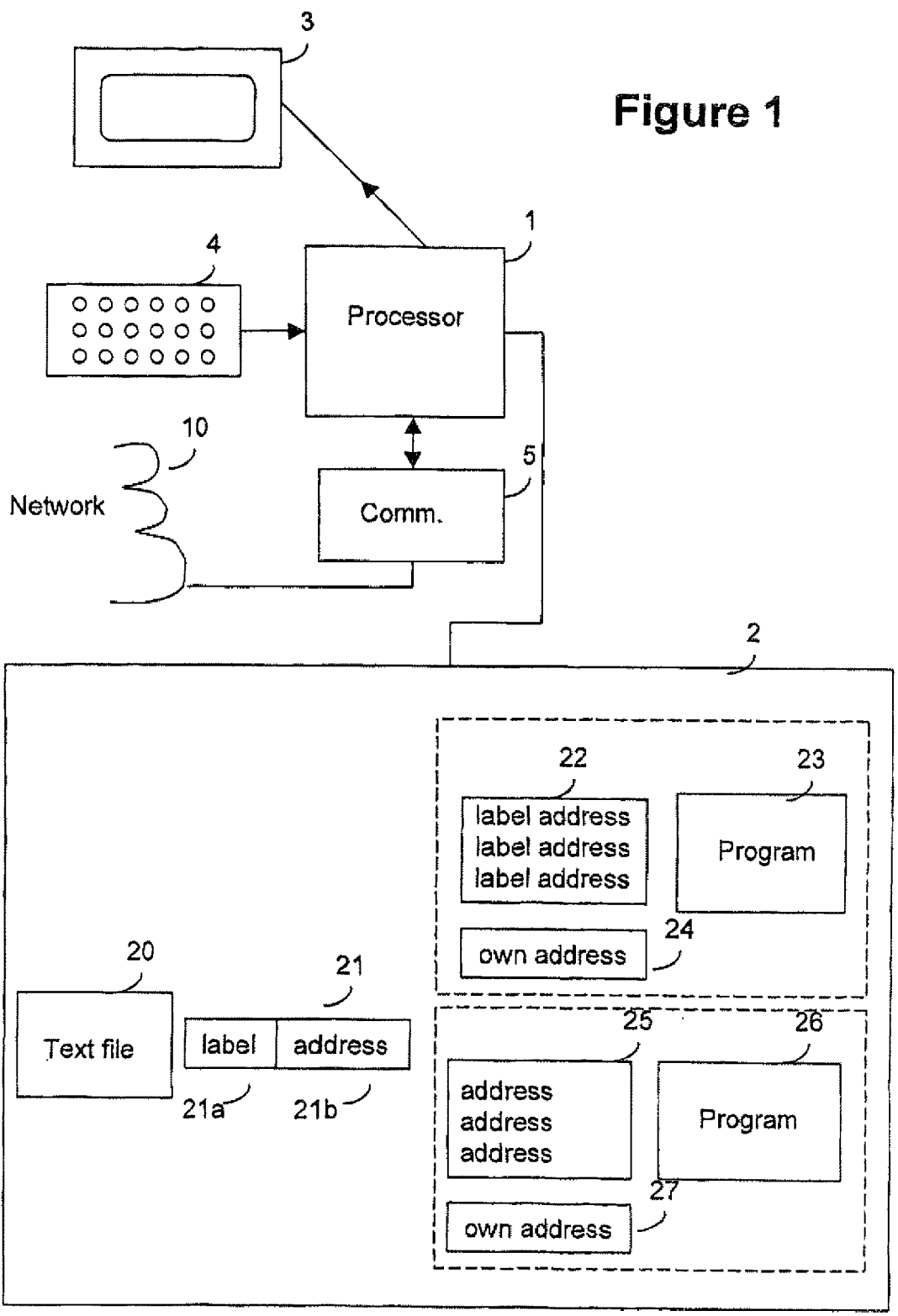
FIG. 1 is a block diagram of a computer used in one embodiment of the invention.

An example is shown in FIG. 1. A computer has the usual components, namely a processor 1, memory 2, display 3, keyboard 4 and a communications interface 5 for communication via a network 10.

The memory 2 contains operating system and other programs (not shown), and data files such as the text file 20 shown. It also has storage 21 containing a label 21a corresponding to the text file 20 and its own address 21b. In addition, it has an address list 22 and a supporting program 23 which together define the existence, on the computer, of a node of a virtual network. This node has an address 24. Also shown are an address list 25 and a supporting program 26 which together define the existence, on the computer, of a node of another virtual network. This node has an address 27. The addresses stored in the lists 22, 25 are the addresses of other nodes in the same virtual network.

Look-Up System

We will now describe a distributed look-up system, though this is only one possible example of an application for the invention. This system allows users to associate comments with a web page. Whenever a user visits this page, he has the opportunity also to view the comments that other users have made. The comment is stored on the computer of the user that contributed the comment (e.g. as a text file).

The user viewing the web page (or rather, his computer) has the universal resource locator (URL) of the web page, and what is required is a mechanism whereby he can retrieve the comments. In this example the mechanism is as follows:

The text file is stored on the computer of the user that contributed the comment and is associated with a node of a virtual network of the type described in our international patent application no. WO 03/034669 [Agent's ref. A30044], as too may be other text files containing comments about other web pages, and possibly other unrelated files too. This virtual network (referred to in the context of the present description as the primary virtual network, or simply the primary network) serves to allow one to send a message to a node without knowing its address provided one has a label which identifies it. Although that type of network can function with unique labels (one per node), in this example the labels are not unique: rather, all nodes associated with text files containing comments about a particular web page have the same label. This label is a hash function of the URL of the web page. This virtual network offers a retrieval mechanism which reaches only one node.

The text file is also associated with a node of a second virtual network. This (the secondary virtual network) contains only nodes associated with text files containing comments about the one particular web page.

Note however that whilst the use of a primary network in accordance with our aforementioned international patent application is preferred, it is not essential. Indeed, it is not essential to use a virtual network at all; another primary retrieval mechanism which receives a label and returns the address of one node corresponding to it could be used instead.

The computer posting a comment is as shown in FIG. 1 and must create a node in the primary network. This node has a label 21a and a network address 24.

create a node in the secondary network. This node has a network address 27.

Initially the address lists 22, 25 are empty, except that the list 22 contains bootstrap links. The self-organisation of the networks to ensure that the list 22 contains the labels and addresses of some other nodes of the primary network and that the list 25 contains the addresses of some other nodes of the secondary network will be described later. For the time being, the system will be described on the assumption that these labels and addresses are present.

A few words about addresses are in order at this point. The node formed by the text file 20, the node of the primary virtual network and the node of the secondary virtual network, whilst conceptually having a single identity, have their own addresses. It would be possible to allocate to each node a distinct address within the communications network 10, although in practice this is not particularly convenient. In our preferred implementation each node has an address consisting of three parts:

An internet address, which "locates" the computing node. E.g. 130.146.209.15

A port number, which locates a particular communication port at the computing node. Ports are a standard part of Internet addresses. They for instance allow different independent application programs to independently send and receive messages. I.e. each would receive messages at its own port, and would not receive or be "confused" by messages intended for other application programs. The Internet address together with the port number can be considered to be the network address (as it is part of the communication protocols, such as TCP/IP, that are used). The network address for all primary and secondary nodes can be the same, however, not necessarily so. For instance, all messages for primary nodes may be received at a different port from that at which secondary messages are received (which is one way to distinguish between such messages).

A node identifier (an integer value), which locates the specific node for which the message is intended. e.g. if all messages on the primary network are received at a dedicated port, there is still a locally unique identifier associated with each node. So, when there are multiple nodes, it is clear for which node the message is intended. This node identifier is an application-specific address extension (it's not part of the standard Internet protocol). It is simply included in the message that is sent. The process that receives it "knows" this and will examine this node identifier to determine to which node the message should be forwarded.

It is possible that both nodes have the same network address, but not necessarily so. Not every node will have a port of its own (partly because the number of available ports is somewhat limited), but one may well have two ports (and thus two different network addresses): one for the primary network and one for the secondary network. Typically, there will be a number of secondary networks, which could all use the same port.

It should be stressed that, in the following, references to the address of a node refer to the complete address of that node.

A particularly attractive approach is to provide that a text file and the primary and secondary nodes all have the same node identifier (and IP address), only the port numbers being different. Such an addressing protocol may provide an opportunity for simplifying some of the processing in that, where one has the address of one node and requires the address of another node associated with it, the address of the latter node might be deduced from that of the former, rather than have to be looked up. In the following description, however, no such simplification has been made, so that these processes will work with any address protocol.

The computer viewing a web page retrieves the associated comments by applying the same hash function to the URL to obtain the label sending a query (containing the label) on the primary virtual network, to obtain the address of one node using the address found, sending a query on the second virtual network to obtain the addresses of more (or even all) all other nodes on the second virtual network.

using these addresses to retrieve the comments for display.

Figure 1A:
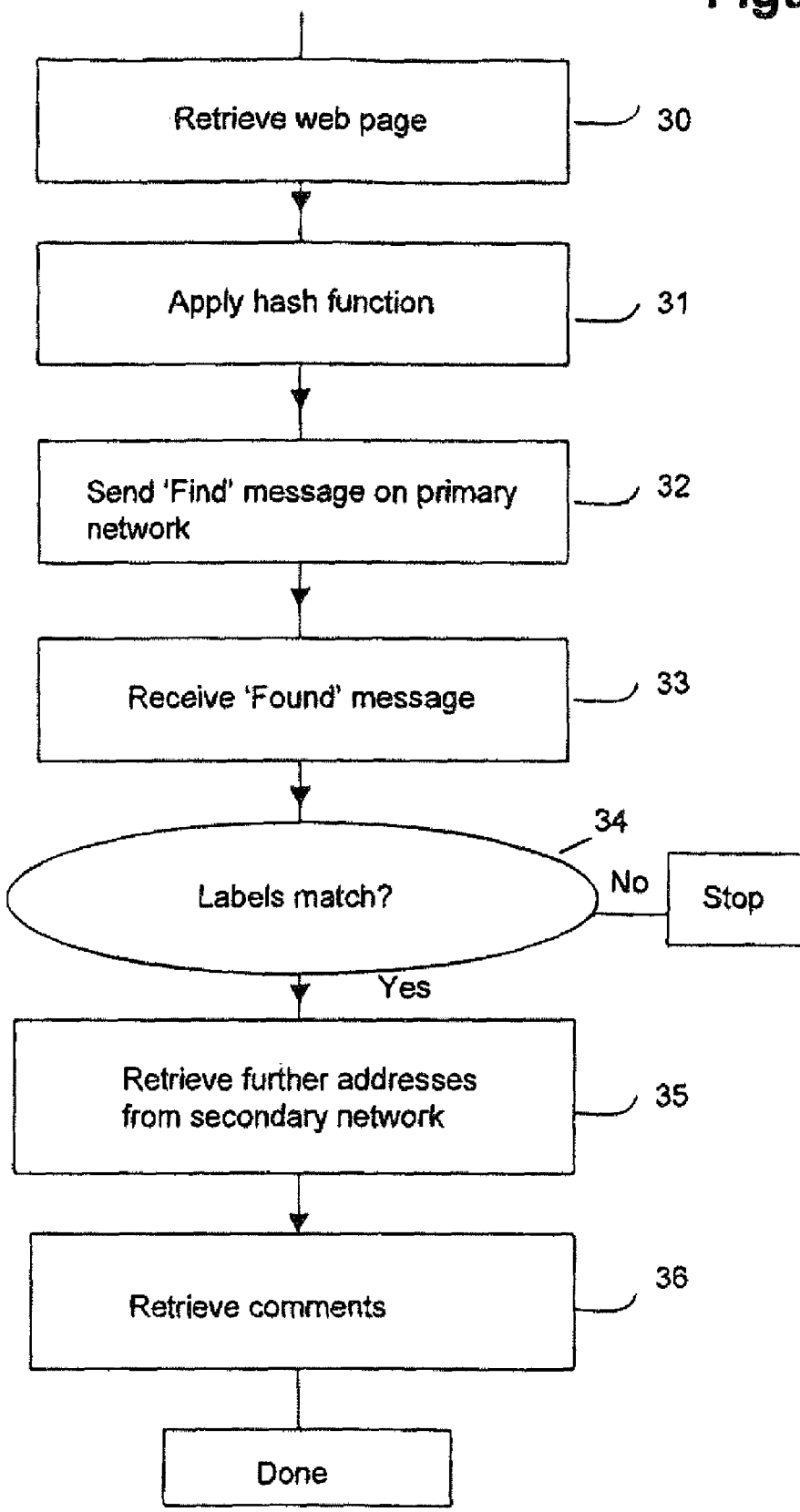
FIG. 1A is a flowchart explaining the operation of the computer of FIG. 1.

Note that the retrieving computer does not necessarily have to contain nodes of the virtual networks; it can be a conventional computer loaded with software for implementing the retrieval process, and with a communication interface so that it can communicate with the computers on which the nodes of the virtual networks reside. This process is shown in the flowchart of FIG. 1A, and proceeds as follows:

Step 30: following the user inputting a URL (or invoking a hyperlink) the computer retrieves the corresponding web page. This step is entirely conventional.

Step 31: a hash function is applied to the URL to obtain a label. As discussed in our earlier international patent application, this could use the SHA-1 algorithm.

Step 32: a 'Find' message, containing this label and the network address of the retrieving computer, is sent to a node of the primary network. Manifestly it is necessary for the computer to be in possession of at least one such address.

Step 33: the retrieving computer receives a 'Found' message from the primary network. This message contains the label and address of a node that has been found as well as the addresses of the associated node of the secondary network, and of the comment. A timeout mechanism could be included to abort the process if a Found message is not received in a reasonable time.

Step 34: in this example, the primary network is arranged so that it always returns the label and address of the node having a label closest to the label contained in the Find message. So a check is performed to see if the label that is returned is the same as that asked for, and if not, the process is terminated. See below for an explanation of the meaning of "nearest".

Step 35: assuming that the labels match, the retrieving computer executes a process (to be described in detail below) whereby it uses the address returned by the Found message to retrieve further addresses using the secondary network.

Step 36: These addresses are then uses to retrieve from the "posting" computers the text files containing the comments.

The Secondary Virtual Network

The aim of this network is to self-organise a group of nodes into a single virtual network, which can subsequently be used to discover all nodes that are part of the group. The main requirement is that the resulting network contains all nodes. Another requirement is that the system load that is needed to create and maintain the network is spread equally across all nodes. Not only is this the most "fair", which is important when different users contribute their resources to a distributed application, it also helps to protect the system against overload.

The network, therefore, has the following properties:

The number of links maintained by each node is preferably the same.

All links are bi-directional. As a result, the number of links to a node are also the same for each node. This is important, as this affects the number of a messages that a node receives and must handle.

It has a "flat" structure. The nodes do not arrange themselves hierarchically. As a result, the system load is spread equally across all nodes.

Structure of Each Node

Each node has the following data associated with it:

Several links to other nodes. Each link is simply the address of another node. Associated with each link is a status, which can be "confirmed" or "unconfirmed". Each node can only maintain a maximum number of links, which is given by the system wide parameter L. A typical value for L is for instance 6. It is not essential that this parameter be the same for all nodes; but there is no advantage to be gained by making them different.

A list of spare links, or spares in short. Each spare is simply the address of another node. The spares are used by the self-organisation process to build the virtual network. A node adds other nodes as spares when it is notified about a node that it cannot add as a link, either because it already links to the node, or because it has the maximum number of links already. The number of spares that a node can maintain is also limited, and given by the system wide parameter S. A typical value for S is for instance 3. The list of spare links is not essential in general, but is very valuable in providing an additional mechanism whereby a link that cannot be accommodated locally can be propagated to some other point in the virtual network. However the use of spare links (or a similar propagation mechanism) is necessary in systems where the incoming Notify messages always arrive at the same node (or one of a very small number of nodes) of the secondary network.

Messages

In order to self-organise into a network and to discover which nodes are part of a given network, nodes send messages to one another: The following types of messages are used by the secondary network:

AddLink message with:
   address of sender
   address of receiver

It is sent by a node (sender) to another node (receiver) to request a mutual link.

ChangeLink message with:
   address of sender
   address of receiver
   address of subject It is sent by a node (X) to another node (Y) to request that it changes one of its links (Z) to a link to itself (X). The protocol is such that X will send a similar message to Z requesting it to change its link to Y with a link to itself (X). So, effectively, X requests to insert itself in the link currently between Y and Z.

LinkAdded message with:
   address of sender
   address of receiver

It is used to notify a node that the sender just added a link to it.

LinkError message with:
   address of sender
   address of receiver
   address of subject
   error code It is used to notify a node that there appears to be a problem with one of its links. For instance, the subject node may not respond, or the link may not be mutual. It includes an error code to indicate the type of error.

Links message with:
   address of sender
   address of receiver
   addresses of all links
   reference value
     the Links message can also contain some other data from the sender node. In the web page comment example this is the address of the associated comment It contains all the current links of the sending node. It is always sent in response to a LinksQuery message. The reference can be used to distinguish the specific query that is responded to.

LinksQuery message with:
   address of sender
   address of receiver
   reference value It is used to request a node to send a Links message in reply (containing its current links).

Notify message with:
   address of sender
   address of receiver
   address of subject
   notify level It is used to notify a node of another node in the network. The notify level is used to control and limit the propagation of Notify messages. As described here, sender address is not used, but is useful for debugging or if it is desired to send acknowledgements.

Building the Secondary Network

The system lets a group nodes self-organise into a single, virtual network, so that if one has the address of one node one can find the addresses of others in the group. This section describes how new links are created when nodes that should belong to the same secondary network are discovered. Two parts can be distinguished here:

Discovery of pairs of nodes that should belong in the same secondary network. What the criterion is for grouping nodes into the same network is application specific. In the web page annotation example, all nodes that represent comments about the same URL should be grouped together in a secondary network. How nodes are discovered that should be grouped together is also application-specific. An example is given shortly.

Updating/extending the secondary network as a result of node discovery. When a pair of nodes is discovered that should belong to the same secondary network, the system may build one or more new links as a result. The new link is not necessarily between the pair of nodes, but may for instance be between nodes that these two nodes link to. How new links are created is described in detail later.

Initial Notify Message

The organisation of the secondary network presupposes the existence of incoming 'Notify' messages that may for example identify an existing and a new member of the group (although early on, it is possible that neither node is yet part of the group, whilst, later in the self-organisation process, both nodes might already be part of the group). It is up to another part of the system to notify the secondary network of nodes that should belong to it. There are different ways in which it can be done. Here we give an example of how this is done when the secondary network is used in combination with a primary network of the type described in our earlier international patent application. In the web page annotation example, each comment publishes itself as a node in the primary network under a label based on the URL of the corresponding web page. This way, the primary network can be used to look-up a comment for a given URL, if one exists. In order to show all comments for a given URL, each comment also has a node of the secondary network associated with it. Nodes that correspond to comments about the same URL self-organise into a secondary network specific to that URL. This way, once the primary network is used to find a single comment about a URL, the secondary network can be used to find other comments about the same URL.

So in this case, nodes of the secondary network that should be grouped together are each published under the same label in the primary network. A mechanism whereby in the primary network, nodes periodically execute a 'Push' update to build and maintain links will be described below, including a modification so that whenever a node becomes aware of another node published under the same label, the needed Notify message is generated.

Handling Notify Messages

When a node receives a Notify message about a node that it does not yet link to, one of the following will happen:

If the receiving node already has the maximum number of allowed links, it adds it as a spare instead (unless it already had it as a spare). If in doing so, the node would exceed its maximum number of spares, it removes one spare. It may then also forward the Notify message to the spare it removed. Whether or not it does so depends on the value of the notify level. The notify level is decreased each time to prevent messages from propagating endlessly.

Otherwise, if the subject node does not yet have the maximum number of links either, the receiving node attempts to create a mutual link between both nodes. This is illustrated in FIG. 2, diagrams a and b. Here, L=3 and Node 1 has received a Notify message about Node 2. Because both nodes only had two links, a link is created between Node 1 and Node 2.

Otherwise, when the subject node already has the maximum number of links, it is not possible to simply create a mutual link between both nodes. So what happens is that receiving node attempts to insert itself in an existing link. This is illustrated in FIG. 2, diagrams c and d. Here, the link between Node 2 and Node 3 is broken, but it is replaced by two new links: a link between Node 1 and Node 2 and a link between Node 1 and Node 3. So the total number of links is increased by one. It works even though Node 2 and Node 3 already had the maximum number of links. However, Node 1 needed to be able to create two new links for this to succeed. The process is explained in more detail in the flowcharts of FIG. 3 to FIG. 9.

Figure 3:
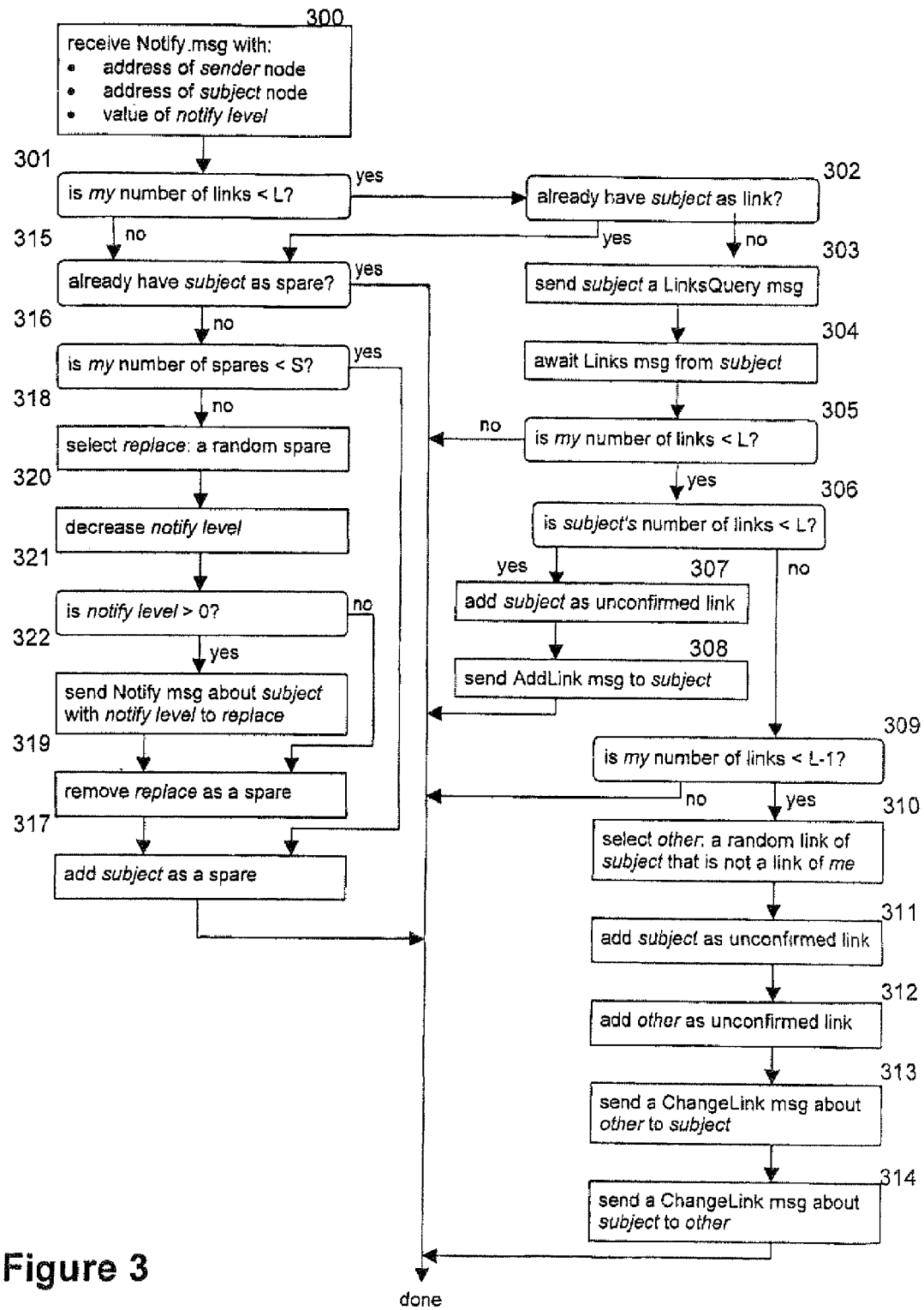
FIG. 3 to 16 are further flowcharts explaining the operation of the system in more detail.

FIG. 3 shows how a node handles incoming Notify messages. Here it is decided whether a new link should be created, and if so how (by adding a new link or by changing an existing link into two links). If no new links are created, the set of spares may be updated and another Notify message may be sent.

At Step 300, a Notify message is received, containing the address of the node that sent it (sender), the address of the subject node, and a propagation limit value, notifylevel. The receiving node firstly checks (301) whether it has space to set up a new link and if so, whether (302) it already has a link to the subject node. If not, it attempts to set up a link with subject.

In Step 303 it sends a LinksQuery message to the subject node, and at 304, awaits a reply. Once the reply—a Links message—is received, it again checks (305) whether it still has space to set up a new link (in case it has received and handled any other messages in the meantime and created links as a result). If so, it then (306) examines the received Links message to check whether the subject node has the space to set up a new link. If it has then at Step 307 and 308 the receiving node adds the address of the subject node to its list of links (but marked "unconfirmed") and sends an AddLink message to the subject node.

If however at Step 306 it is determined that the subject node cannot accept further links, the receiving node then attempts to insert itself into an existing link as mentioned earlier with reference to FIG. 2. The first step (309) is to check whether the receiving node has space for two links; if not, the process is terminated. If however it has, then the receiving node selects a link at random from the list of links in the received Links message (but not a node to which the receiving node already has a link), that is, a link between the subject node and another node referred to here as other. The receiving node then attempts to insert itself into this link by:

311 adding the address of the subject node (unconfirmed) to its list of links;
312 adding the address of the other node (unconfirmed) to its list of links;
313 sending to the subject node a ChangeLink message containing the address of other;
314 sending to the other node a ChangeLink message containing the address of subject.

Supposing however that at Step 301 it is determined that the receiving node has no space to add a link, or that at Step 302 it already has a link to the subject node, then the process examines whether the receiving node should add a link to its list of spare links. In Step 315 the process terminates if it is found that the subject node is already in the spares list. At 316 it is checked whether there is space to add a link to the spares list and if so this is duly added at 317. If not, then an existing one of the spare links is selected at random at 318, and removed at Step 319 so that it may be replaced by a link to subject at Step 317. Also, the variable notifylevel is decremented at 320 and if (Step 321) it remains nonzero the original Notify message—with this new value of notifylevel—is forwarded at Step 322 to the node (referenced as replace) pointed to by the randomly selected existing link.

The effect of this process is that when a node A that already has a full set of links receives a Notify message asking it to link to a subject node B, B's address is recorded as a spare link. This link remains dormant until A's list of spare links is full. Then, when A receives a later Notify message asking it to link to node C, and the spare link to node B is selected at Step 318, the new Notify message generated at Step 322 is in effect a request to node B to create a link from itself to node C.

A mechanism is also provided—but not shown on the flowchart—whereby when a link is unconfirmed and the receiving node does not receive confirmation (by way of a LinkAdded message as described below with reference to FIG. 6) within a give period of time, the unconfirmed link is deleted Note that when the receiving node has links that still have an "unconfirmed" status, it returns these unconfirmed links (as well as, of course, the confirmed ones) in response to LinksQuery messages, allowing other nodes to confirm that it is attempting to set up the link.

In FIG. 3, the "no" exits of Steps 305 and 309 lead to termination of the process: however if desired they could be routed to the "spare link" process commencing at Step 315, with a slight improvement in efficiency.

In Steps 309 to 314, the node effectively breaks one of subject's links and inserts itself in between. Another possible option, not shown in the flowchart, would be for the node to break one of its own links (assuming of course that it already has at least one link) and insert subject in between. This option, if implemented, would be tried immediately after the 'no' exit from Step 301. Firstly the receiving node would need to check whether subject had fewer than L−1 links, select at random one of its own links (to a node other), replace this with an unconfirmed link to subject, and send an AddLink messages to subject. In order to establish a bidirectional link between subject and other it would then (a) send to subject a special AddLink message requiring subject to add, unconditionally, other as an unconfirmed link to its list of links and (b) send to other a special ChangeLink message with the receiving node as the old link to be removed and naming subject as the new link to be added. This option could be included as well as, or instead of, Steps 309 to 314.

Another option for the receiving node to break one of its own links would be for it (having firstly verified that subject had fewer than L−1 links) to send to subject a Notify message naming itself as subject. This would have the same outcome but involve a slightly larger messaging overhead.

Figure 4:
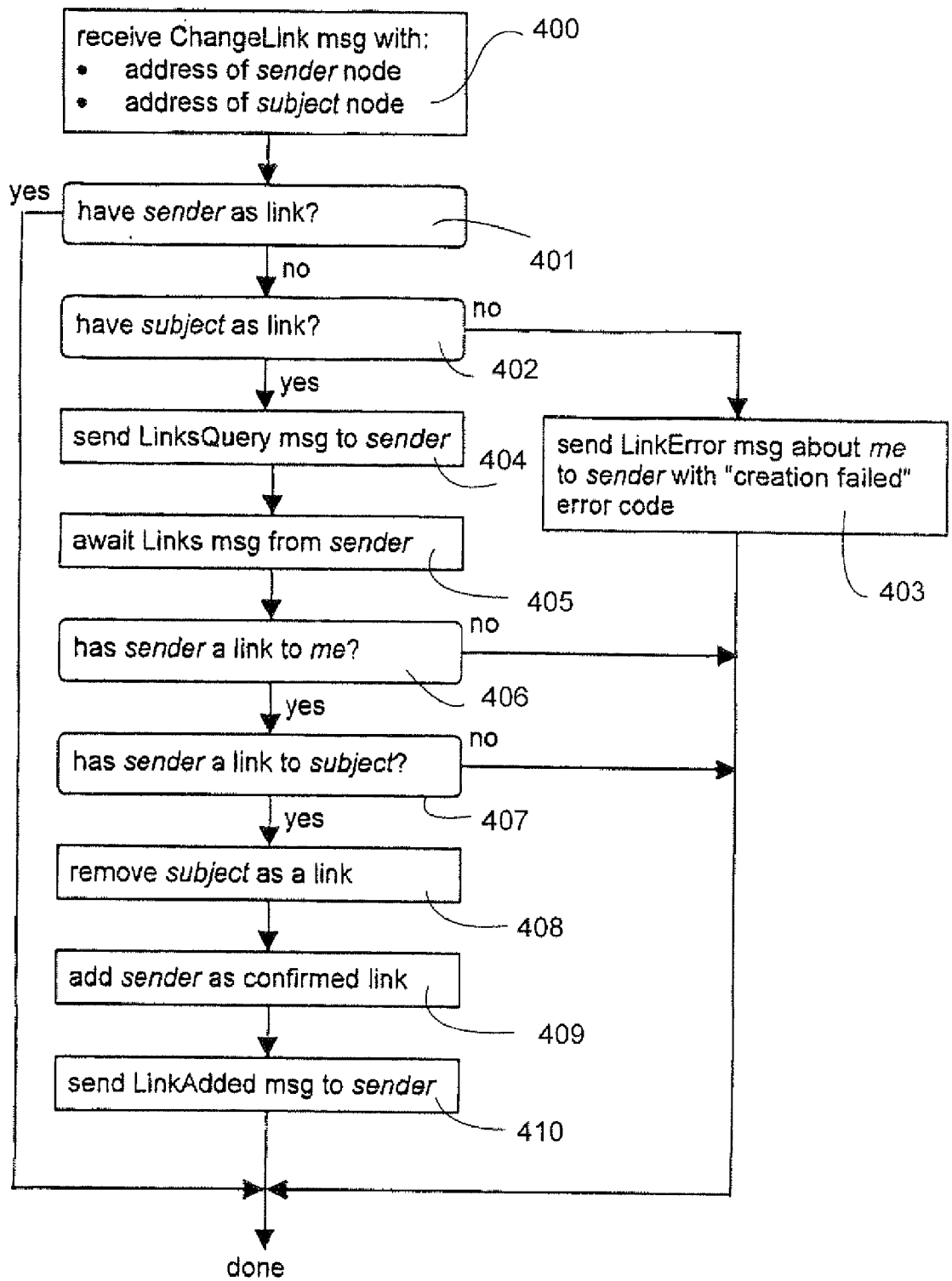

FIG. 4 shows how a node handles incoming ChangeLink messages. These messages are sent when a node X that received a Notify message wants to change an existing link into two new ones (see FIG. 2). The receiving node Y receives at 400 a Notify message with node Z as subject, i.e. asking node Y to replace its existing link to node Z with one to node X. If it already has a link to X, it takes no further action (401), whilst if (402) it does not in fact possess a link to node Z it sends 403 an error message to the sender, X.

Assuming all is well, it sends (404) a LinksQuery message to the sender X and awaits (405) a Links message in reply from the sending node X to check that the latter has indeed created the two new links it should have created before changing the subject link. If these checks (406, 407) are successful, The receiving node removes its link to Z (408), adds X as a confirmed link (409) and returns a LinkAdded message to the sender X (410).

Figure 5:
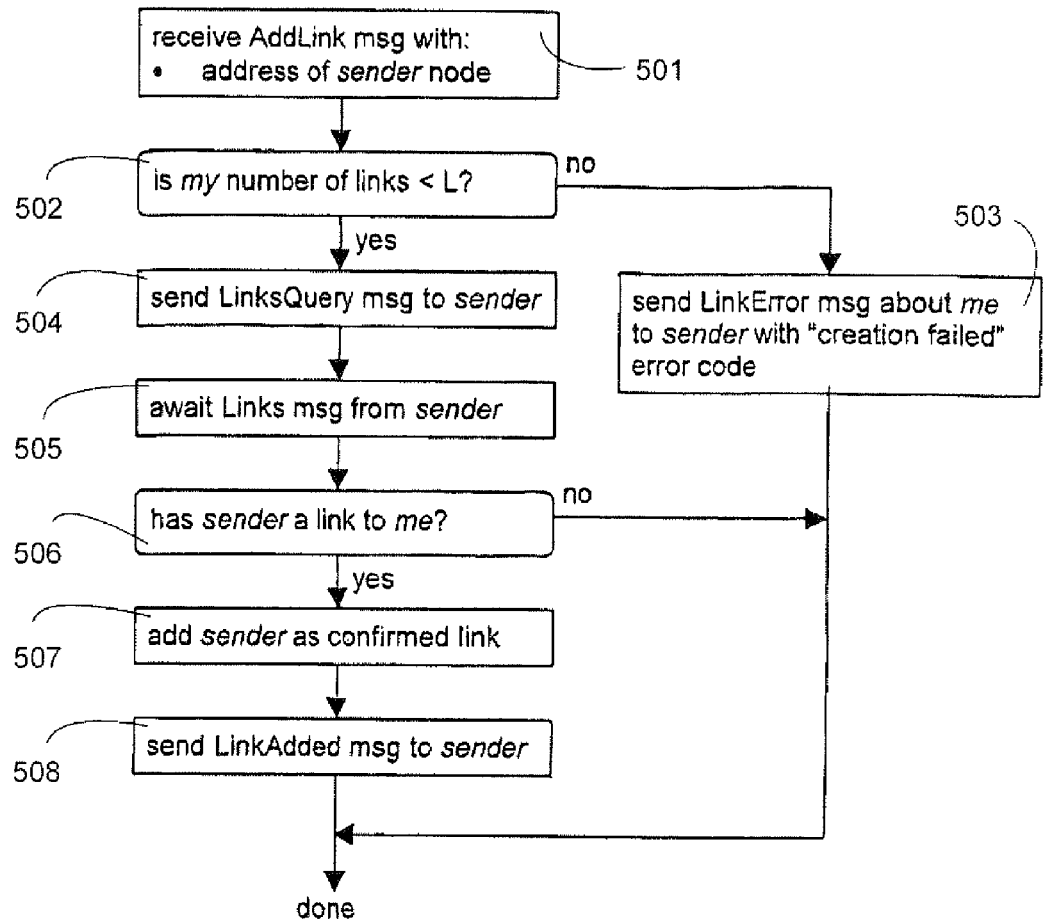

FIG. 5 shows how a node handles incoming AddLink messages. These messages are sent when a node wants to create a new link with a node (see FIG. 1). The message having been received at 501, the node checks at Step 502 whether it has space for another link and if not, returns an error message at 503. Otherwise, it sends (504) a LinksQuery message to the sender and awaits (505) a Links message in reply from the sending node, so that it may check at 506 that the latter has indeed created a links to the receiving node. If no, it declines to add the link and terminates, but if so it then adds sender as a confirmed link (507) and returns a LinkAdded message to the sender (508) by way of confirmation.

Figure 6:
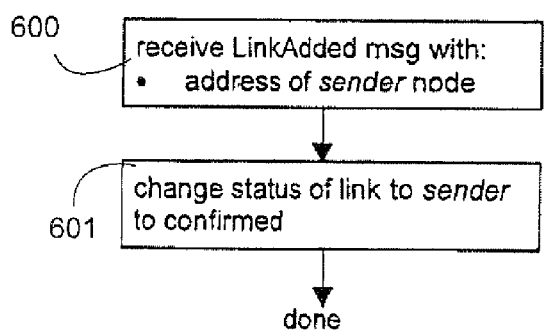

FIG. 6 shows how a node handles incoming Link Added messages. These messages are sent when another node has accepted a link to the receiving node, either in response to a ChangeLink or an AddLink message. When the LinkAdded message is received at 600 indicating that a link has been accepted, its status is changed to "confirmed" at Step 601. The link will then be maintained until either it is changed for a new link (in response to a ChangeLink message), or the link is broken.

Figure 7:
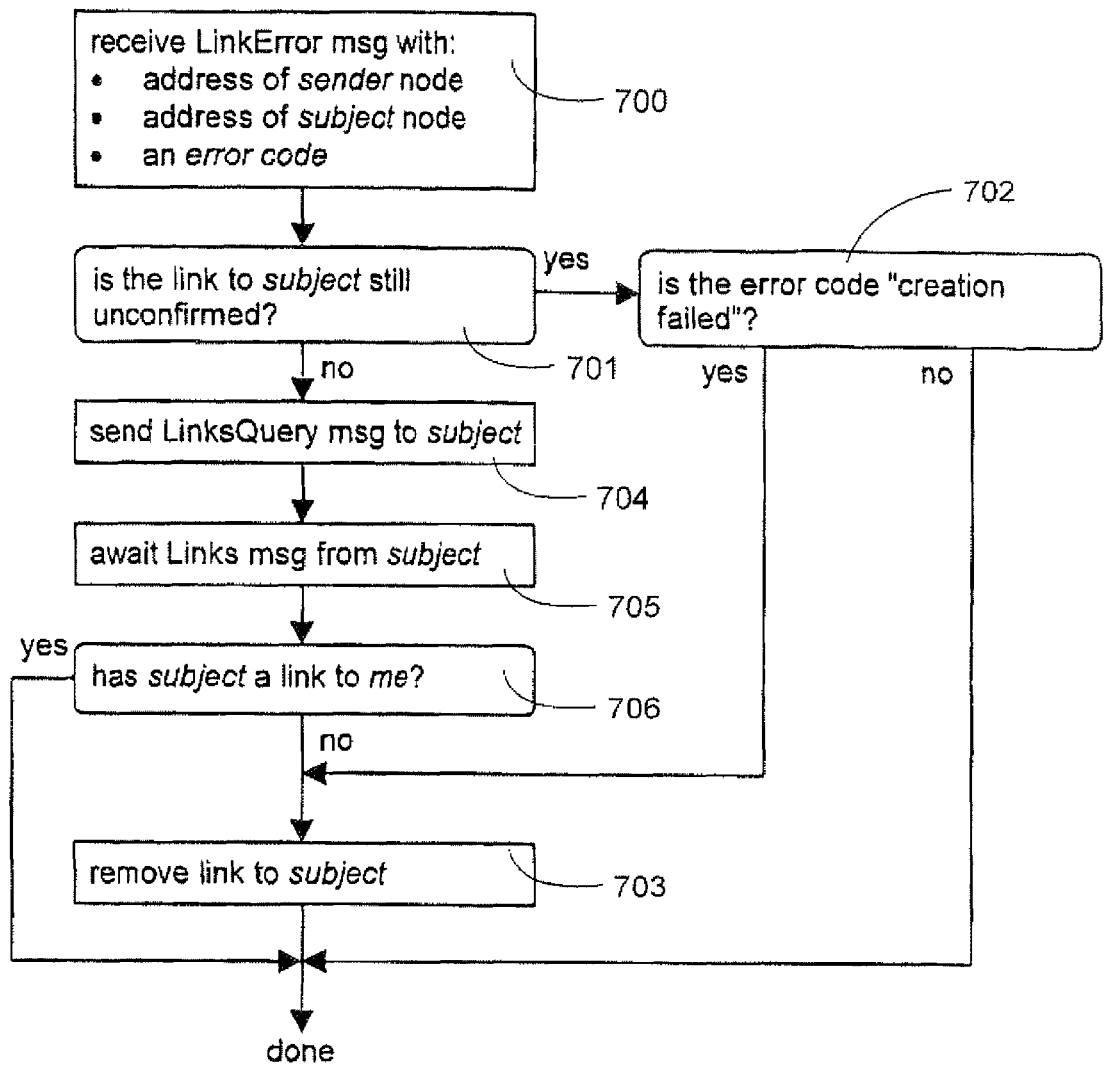

FIG. 7 shows how a node handles incoming LinkError messages. These messages are sent when either a node was unable to create a link to the receiving node after the latter requested a mutual link (by way of a ChangeLink or AddLink message), or a link appears to be broken (the node at the other end may not be responding to messages, or the link may not be mutual). Broken links are not detected by the self-organisation process, but when clients traverse the secondary network (as will be explained later).

Following receipt of the message at 700 it is determined (701) whether the message is about a node to which the receiving node has an unconfirmed link. If so, and (702) it carries an error code indicating failure to created a requested link, then the link is removed at 703. If however the message is not about a node to which the receiving node has an unconfirmed link, the receiving node sends (704) a LinksQuery message to the subject, awaits (705) a Links message in reply, checks the reply at 706 to check whether the subject has a link to itself, and if not then in Step 703 removes its link to the subject node.

Figure 8:
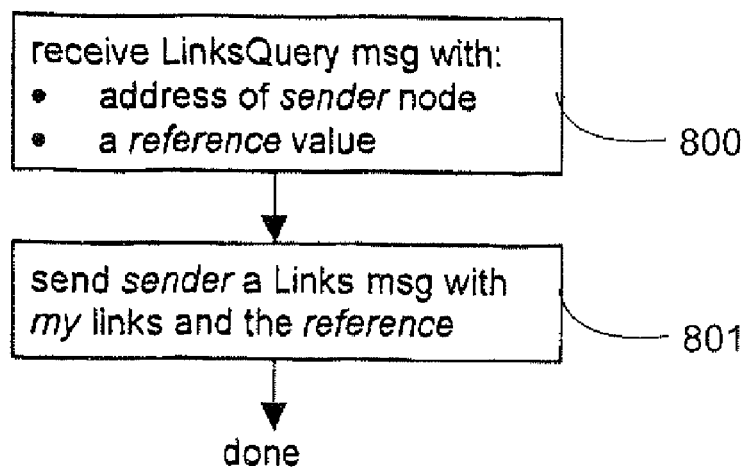

FIG. 8 shows how a node handles incoming LinksQuery messages. These messages are sent when another node wants to know the links of the receiving node, and the latter upon receipt thereof at 800 therefore responds at 801 with a Links message.

Figure 9:
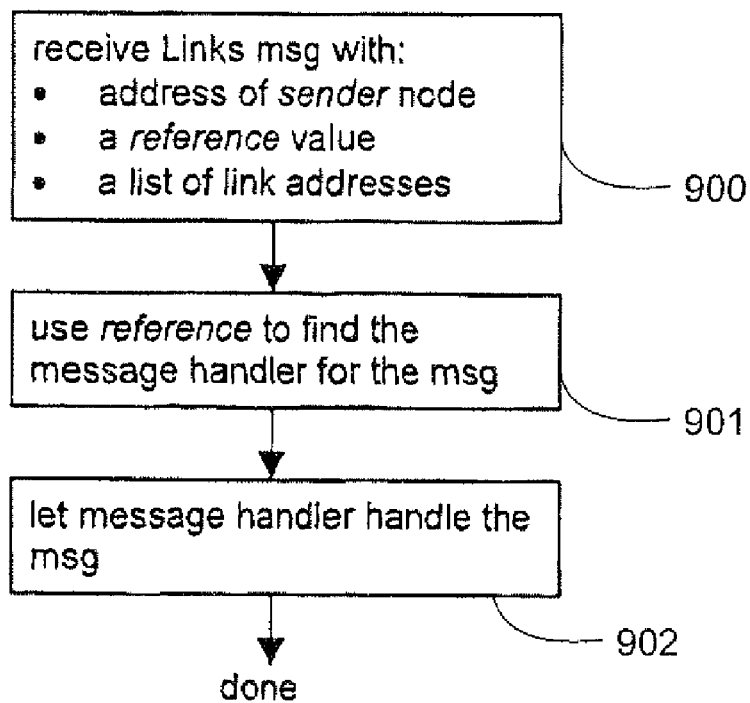

FIG. 9 shows how a node handles incoming Links messages. Now it is handled depends entirely on why the corresponding LinksQuery message was sent. This happens for different reasons, as shown amongst others in FIG. 3, FIG. 4, FIG. 5 and FIG. 7. So what happens is that when a Links Query Message is sent, it is given a reference that is locally unique and a message handler is associated with the reference. Then, when a Links message is received (900), the appropriate message handler is identified at Step 901 and the message is forwarded at Step 902 to the appropriate message handler so that the message is dealt with in the right way.

It may of course happen that no Links message is ever received in response to a LinksQuery, for instance because the receiving node has been shut down. Therefore, if after a given period no Links message has been received the corresponding message handler is removed. Although this has not been explicitly shown in any of the flow charts discussed here, it simply means that when a links query times out, no further action is taken and the entire flow chart is "done".

Retrieving Nodes

Given the address of a single node of the secondary network, it is possible to discover other, potentially all, nodes in the network. The way that this can be done is very simple. One sends to the known node a LinksQuery message to request all its links. The node replies with a Links message, containing the address of all the nodes it links to. One can then contact each of these nodes in turn, requesting their links and thus obtain the addresses of all their links. By continuing in this way, one traverses the network and gradually discovers all the nodes it contains.

Figure 10:
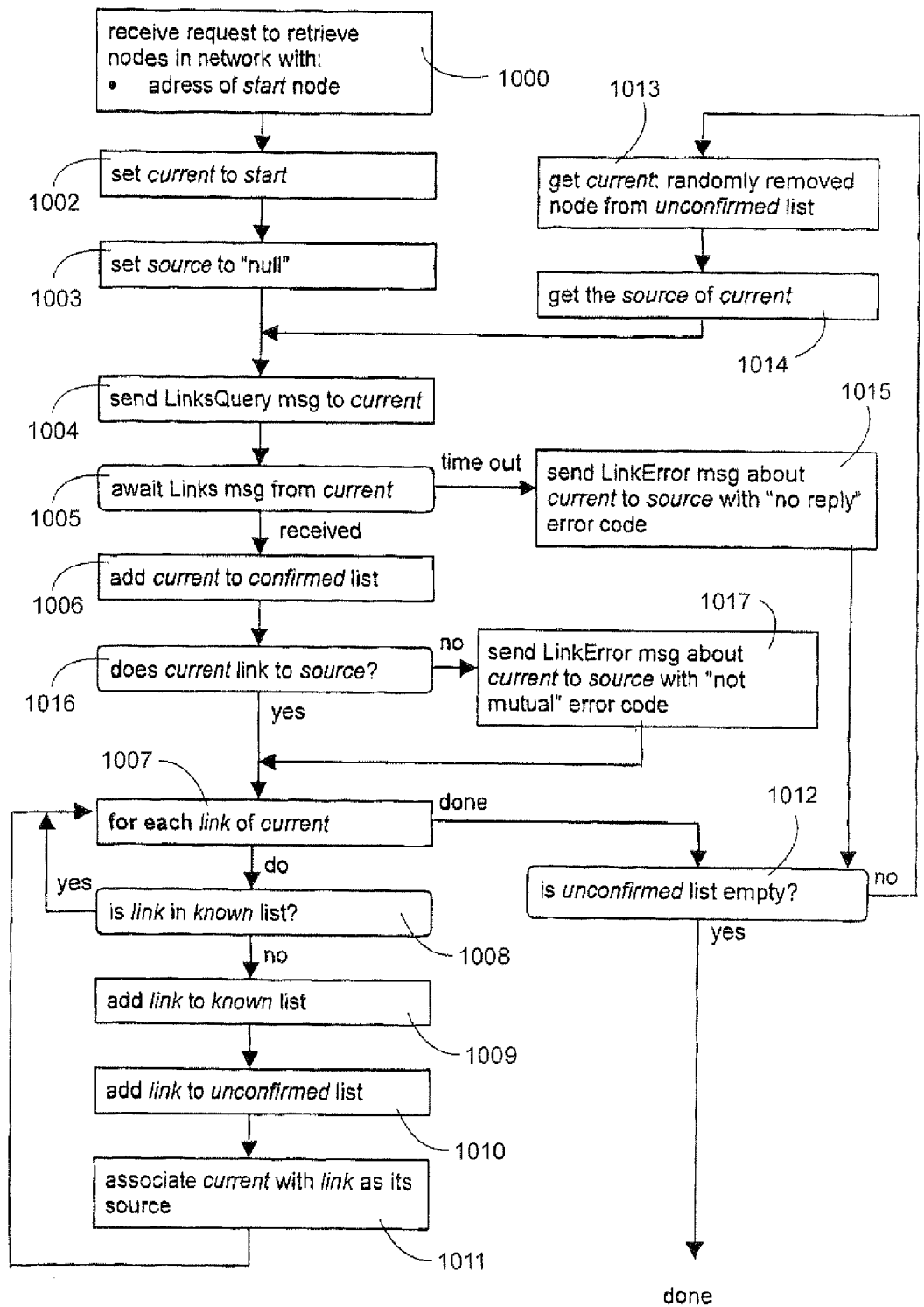

FIG. 10 shows the process in more detail. It will be understood that this is the process used in the retrieval step 35 shown in FIG. 1A. The addresses of all known nodes that have successfully been contacted are put in the "confirmed" list. Data may be retrieved at the same time. In the case of the "web page comment" example, the relevant item of data is the address of the comment, and this too is entered into the confirmed list alongside the node address. The confirmed list then provides the addresses needed for the "Retrieve" comments step (36) in FIG. 1A. The "unconfirmed" list, on the other hand, contains the addresses of known nodes that have not yet been contacted. Finally, the "known" list contains the addresses of all known nodes. It includes all addresses in the "confirmed" and "unconfirmed" list, but also the addresses of nodes that have been contacted and that have not responded. The known list also has, for each address entered into it, an additional field for containing a source address—that is, the address of the node from whose list the address to which the current pointer points was obtained, for error reporting purposes.

It is not material where the retrieval process occurs: it may be at a node, or somewhere else. At Step 1000, a request to retrieve node addresses is received along with a start address, that is, the address of one node that had been determined to belong to the virtual network in question. In Step 1002, an address pointer, current is initially set to this address whilst a second address pointer, source is initially null (1003).

At Steps 1004 and 1005 a LinksQuery message is sent to the address given by current, and a reply awaited. When a Links message is received, current is added to the confirmed list (Step 1006), with the comment address from the Links message alongside it.

At step 1007, a sub-process is entered, which is performed for each of the addresses contained in the Links message. If (1008) the address is already in the known list, the process steps on to the next address. Otherwise the address is added to the known list and to the unconfirmed list (Steps 1009, 1010).

Also (1011), the address in current is entered into the known list as being the source of the address added.

Once this sub-process is complete, then (unless the unconfirmed list is empty, in which case the process terminates at Step 1012) at Step 1013 an address is selected at random from the unconfirmed list. This address becomes the new current address, and is deleted from the unconfirmed list. The next step (1014) is to look up current in the known list to retrieve the source address associated with it, and enter this in the source pointer. The random selection is not mandatory. E.g. current could be chosen to be the "oldest" node in the unconfirmed list, or the list could be sorted by another criterion (e.g. node's addresses) and current could always be the "first" node in this list. However, random choice of current has its advantages. It spreads the load in the system (in particular if not all nodes are always retrieved), and also spreads the testing of the links of the network so that broken links are discovered more quickly.

The process then continues again from Step 1004 and iterates until the unconfirmed list is empty—i.e. no further new addresses can be found.

A side effect of the retrieval process is that it discovers broken links. For instance, it may happen that a node is not responding, or that a link is not mutual. The latter is the case when a node A links to node B, but node B does not have node A in its link table. When a broken link is discovered, the node that is the "source" of the link is notified by way of a LinkError message. As FIG. 7 already showed, the source node can then check the link itself (to confirm the accuracy of the error report) and may remove the link as a result. A node that is not responding is recognised by the failure at Step 1005 to receive a Links message within a set time-out period and at Step 1015 an error message, containing the address of current and a "no reply" error code, is sent to source, whereupon control returns to Step 1012. The non-mutuality of a link is recognised by testing at Step 1016 to determine whether the Links message received for current contains the address of source: if not, an error message, containing the address of current and a "not mutual" error code, is sent (Step 1017) to source, but the retrieval process continues as before, as it is the responsibility of the source node to take remedial action (in accordance with the process of FIG. 7). The test at Step 1016 is skipped if source is null.

Note that even though multiple confirmed nodes may link to a node that does not respond to a Links message, only the node that first contributed the link (the source node) is notified that there was "no reply". This is partly because it makes the flowchart easier to understand. However, it can be argued that there is another, practical benefit. It may be a case that a node does not reply (in time) because it is temporarily overloaded. In this case, one may not want multiple nodes to simultaneously sent it a LinksQuery message to test if there is an error (as in FIG. 7). Either way, if desired, it is straightforward to update the node retrieval algorithm to notify all known nodes that are affected by a broken link, when such a link is discovered.

In FIG. 10 the node retrieval does not stop until all known nodes have been contacted. In practice, one may wish to terminate the process earlier. For instance, if a user is looking for a location from which to download a file, it may be sufficient to offer him or her the choice of ten potential download addresses instead of, say, all thousand.

The algorithm in FIG. 10 is shown as entirely serial. Only one node is contacted at a time. Another LinksQuery message is sent only after a reply has been received to the previous one (or it has been timed out). In practice, however we prefer to speed up the retrieval by issuing multiple LinksQuery messages in parallel. It may also be the case that at box 1000 multiple retrieval requests are simultaneously handled by multiple instances of the process of FIG. 10.

Discussion

Successfulness of Self-Organisation

The aim of the secondary virtual network is to self-organise all nodes that should be grouped together into a single network, as opposed to several unconnected networks. Whether or not this is the case depends largely on how the initial Notify message is generated. For instance, if there is a group of twelve nodes that should all be grouped together, but of this group five nodes only receive notifications about other nodes in this group of five, and none of the other seven nodes are notified about any of these five nodes, it is impossible for the nodes to self-organise into a single network. Instead, they arrange into two separate networks, one of five nodes, and one of seven nodes. However, as long as the initial notifications are not such that it is impossible for nodes to self-organise into a single network, the self-organisation process is such that it is very unlikely that nodes do not self-organise into a single network. Calculation of the probability that the self-organisation results in a single network is complicated and depends on the mechanism by which the initial notifications are generated. However, in simulations we have experimented with several different initial notification mechanisms, and so far nodes never failed to self-organise into a single network.

Robustness to Malicious Nodes

So far it has been assumed that all nodes obey the protocol. However, it is possible that there are malicious nodes that do not play by the rules. They may try to break links maintained by other nodes and/or try to obtain too many links to themselves. It is desirable that the overall system is as robust as possible to such abuse.

The system described so far is already fairly robust to malicious nodes. That is because each node always check with a LinksQuery-Links message exchange the links maintained by the other relevant node before changing its own links. For instance, when a node receives an AddLink message (see FIG. 3), it first checks that the sending node has indeed linked to it, before adding the sender as its own link.

However, the system still has a relative weakness. As it stands, nodes can easily "lie" when they respond with a Links message. Often a node sends a LinksQuery message to check that the receiving node links to it. Knowing this, the receiving node can reply with a faked Links message modified such that it always contains the sender of the Links message as a link. This enables a node to have much more than the allowed number of L nodes linking to it. This would, consequently, reduce the overall number of "good" links in the system.

Fortunately, there is a way to address this weakness. This can be done if nodes sent their LinksQuery through a proxy node. These proxies are randomly chosen each time a node want to send a query. Each node can for instance use the nodes it currently links to as proxies. This way, the node (A) that wants to know the links of another node (B) is unknown to Node B, because the LinksQuery messages it receives is from a proxy node (C), and the message that Node B receives from Node C does not refer to Node A at all. Therefore there is no good way for Node B to send fake messages that have a significant effect on the overall system.

Of course, there's the question of what the effect is of malicious proxies. Although obviously malicious proxies have a detrimental effect (it is inevitable that nodes that do not obey the protocol affect the performance to some extend), this effect is limited. The reason is that they can only maliciously handle the LinksQuery that they are asked to forward, and these requests are spread roughly equally across all nodes. On the other hand, when proxies are not used, malicious nodes can cause havoc by being very active. If these nodes send many spurious AddLink messages, and fake the many Links message they subsequently send, the effect on the overall system is much larger.

Primary Virtual Network

The primary network is described in detail in our aforementioned international patent application. Here, the basic retrieval and self-organisation mechanisms will be described, along with a modification that enables the generation of Notify messages for driving the self-organisation of the secondary network.

Firstly it is necessary to explain the concept of virtual coordinate space used by this mechanism. It has already been mentioned that each node has a label. The label is translated into coordinates in a virtual space. The space can be one, two, or higher dimensional. The precise translation mechanism is not very critical: for a one-dimensional space the label, considered as a binary number, can be used directly as the coordinate. For two or more dimensions the preferred method is that the label, considered as a string of bits, is partitioned into two or more equal groups, each group, considered as a binary number, forming one of the coordinates. Each coordinate (or the coordinate, in a one-dimensional space) is scaled to lie in the range [0,1].

The distance between two labels in this virtual space is the Euclidean distance between the two coordinate sets (though other distances such as the city block distance (often called the Manhattan distance) could be used if desired. The coordinate space wraps, so that the distance in the x-direction between $x_1$ and $x_2$ is $$\text{Min}\{(1-|x_1-x_2|),|x_1-x_2|\}$$

and the Euclidean distance in two dimensions between points $(x_1,y_1)$ and $(x_2,y_2)$ is therefore $$\sqrt{\{[\text{Min}\{(1-|x_1-x_2|),|x_1-x_2|\}]^2+[\text{Min}\{(1-|y_1-y_2|)\}]^2\}}.$$

We also recall at this point that each node has a list 22 (FIG. 1) with a number of entries representing links to other nodes. Each entry consists of the label and address of such another node. Initially this list is empty and therefore the node has a second, similar, list of bootstrap links—that is, a few links (typically four) so that it is initially able to contact other nodes of the network. As well as the links in the list 22 (referred to as short-range links), the node may also have additional such lists arranged hierarchically, and/or a list of long-range links. These are described in our earlier international patent application, but, as they are optional, are not described here.

Messages

Figure 11:
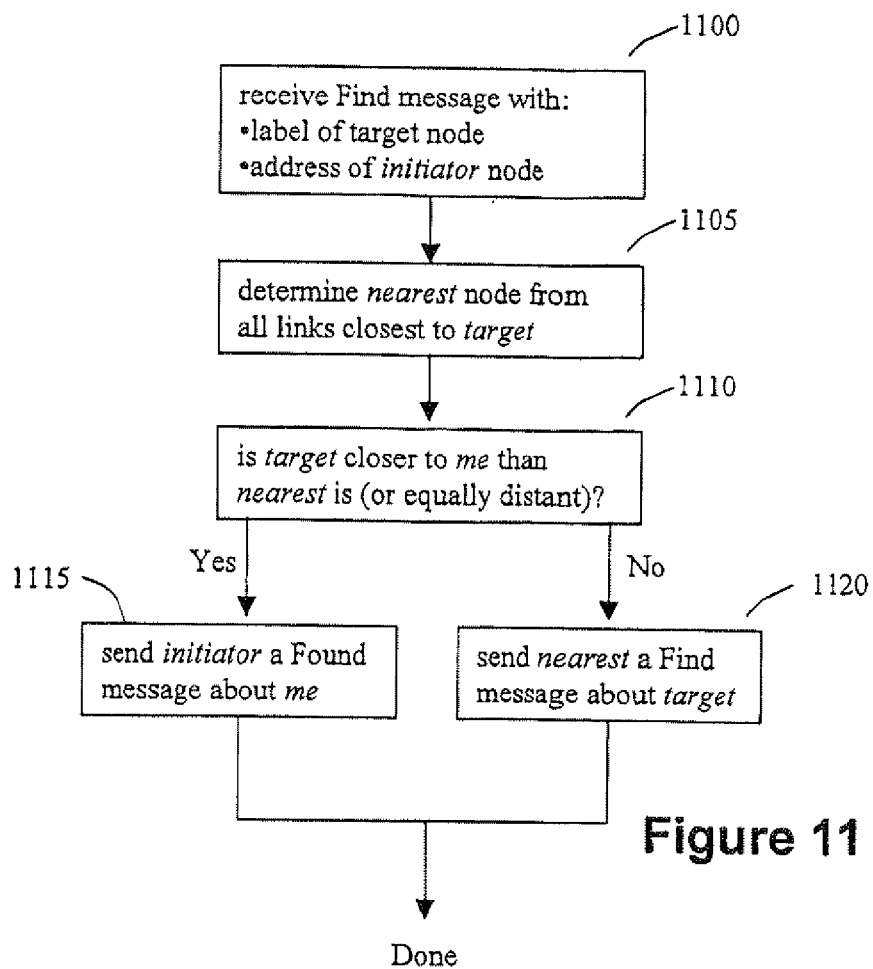

Firstly, the following messages are used (note that the messages used in the primary virtual network are different from, and completely independent of, the messages used in the secondary virtual network):

FIND messages are used to initiate and fulfil node look-ups and to support "PULL" updates. They contain:
 the label of a target node
 the address of the node that initiated the query FOUND messages are used to return the results of queries. They contain:
 the label of the target node
 the label of the node that was found
 the address of the node that was found
 the address of the node of the secondary network that is associated with the node that was found
 application-specific data—in this case the address of the comment node that is associated with the node that was found PUSH messages advertise a node's label to other nodes. They contain:
 the label of a subject node
 the address of the subject node
 the number of hops to go to reach a target node NOTIFY messages are used to propagate push-updates. They contain:
 the label of a subject node
 the address of the subject node Retrieval FIG. 11 shows how each node handles incoming Find messages. In principle, the receiving node looks for a node which is closer than itself to the target node identified in the Find message and, if successful, passes on the Find message. If not successful, it returns its own address and label. It does this by carrying out the following steps:

Step 1100: the node receives a Find message which contains the label of a target node and the address of an initiating node;

Step 1105: the node translates the label of the target node into co-ordinates in label space and calculates which, of all the links (nodes) it has recorded is closest to the target node in label space. The relevant node is designated nearest node;

Step 1110: the node compares the distance between its own co-ordinates and those of the target node with the distance between the co-ordinates of nearest node and those of the target node;

Step 1115: if the distance between its own co-ordinates and those of the target node is less (or equal), the node sends to the initiating node, via the network 10, a Found message containing its own label and address;

Step 1120: if the distance between the co-ordinates of nearest node and those of the target node is less, the node forwards the Find message to nearest node.

Figure 12:
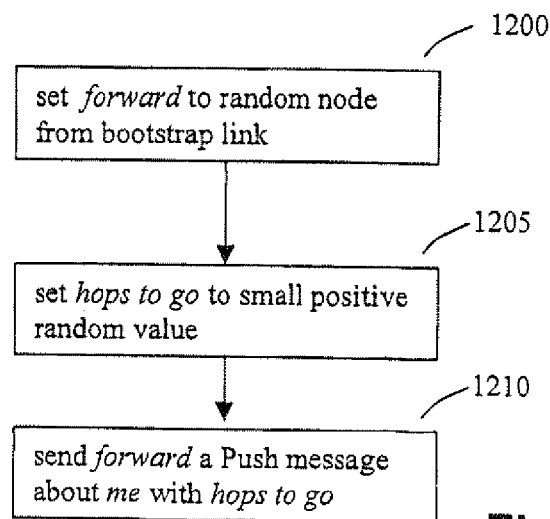
Figure 13:
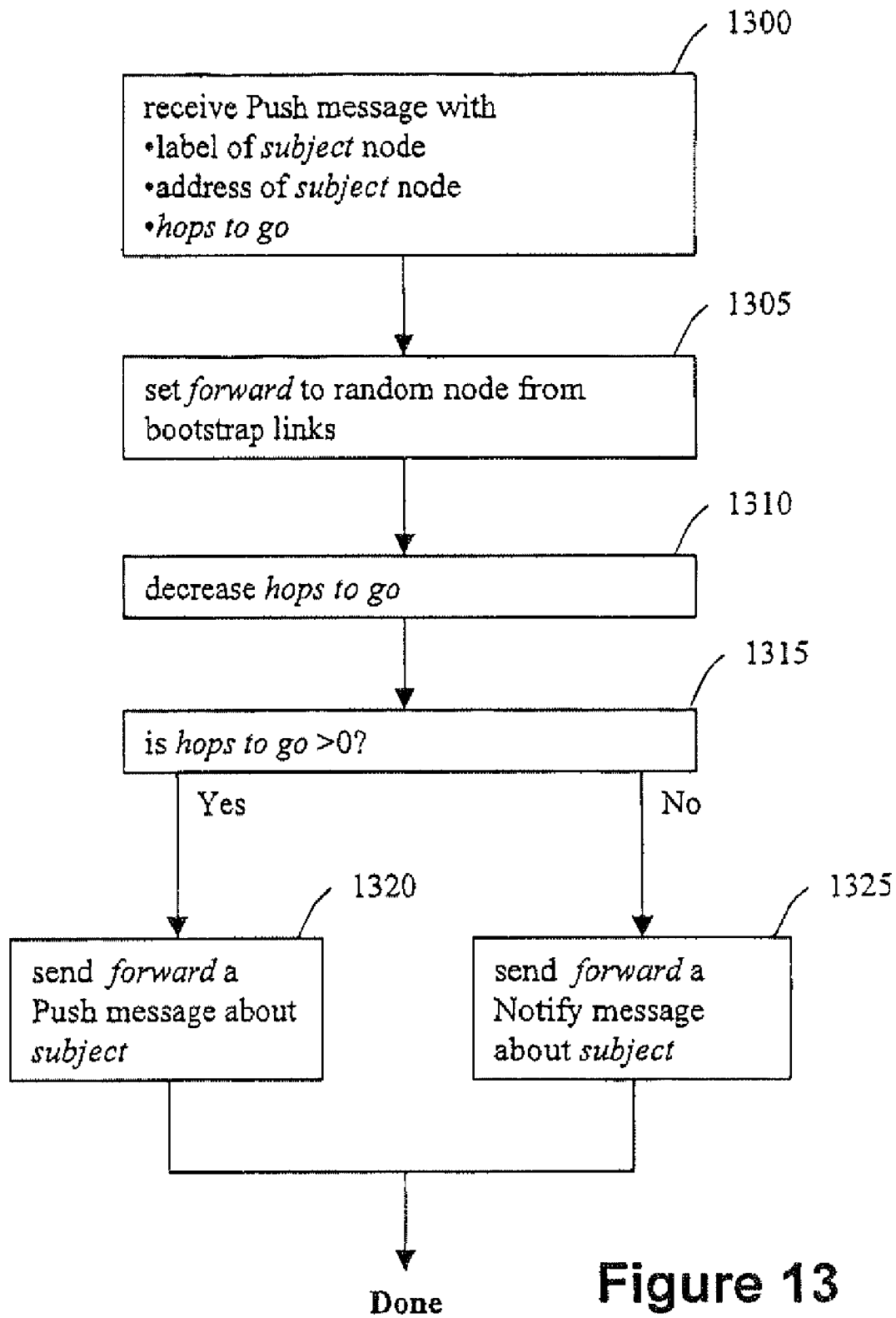
Figure 14:
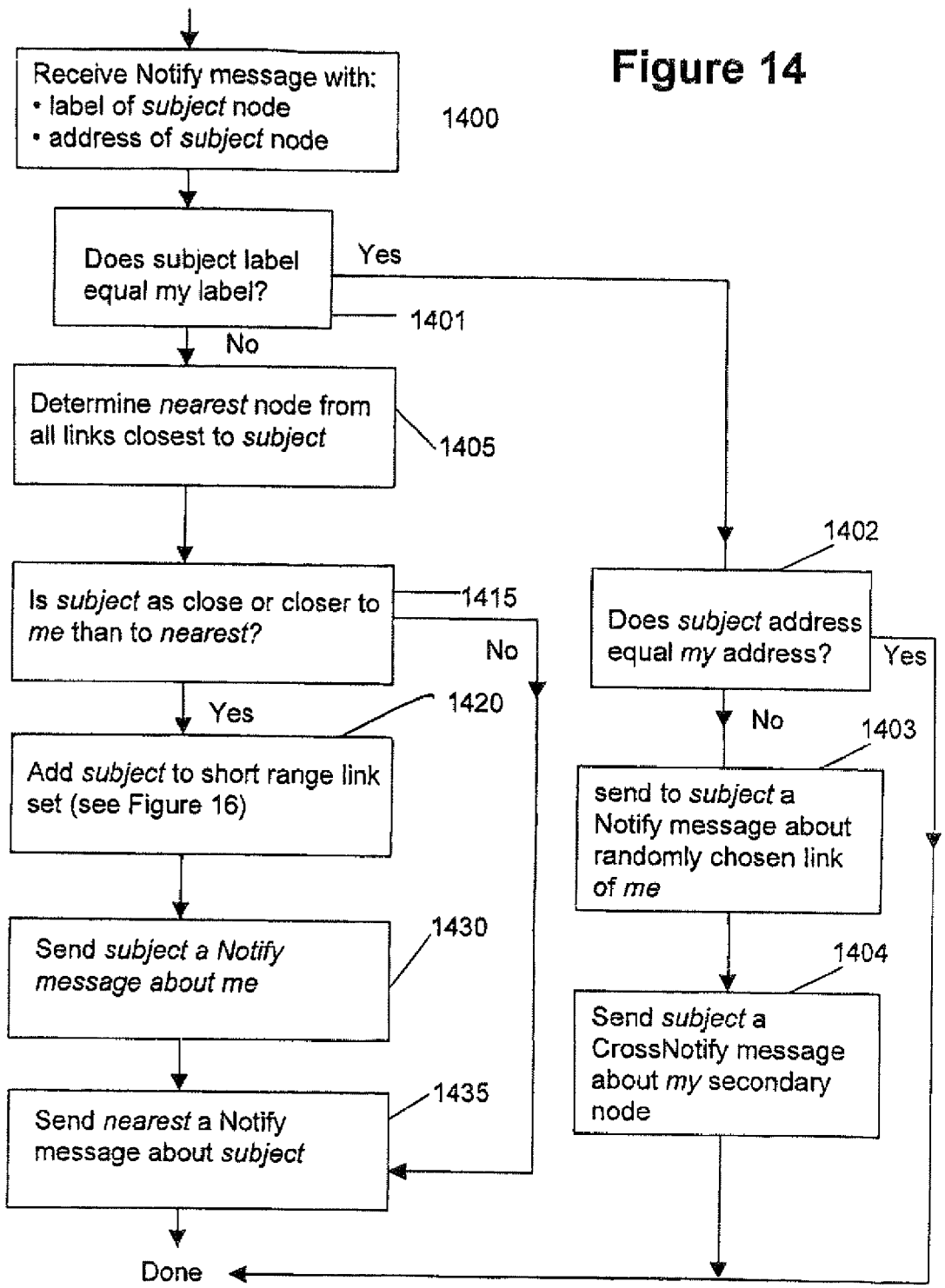

The address of the node returned in Step 1115 is either that of one with the target label, or one close to it in label space. When the returned label does not match the target label, it may mean either that the target node does not exist or that the virtual network is not sufficiently self-organised Push Each node spontaneously initiates Push updates. For instance, each node might start a Push update process periodically. In a Push update, a node sends out a Push message with its own label and address through a random series of nodes, setting a limit on the length of the series. The last node in the series sends a Notify message back towards the initiating node. FIGS. 12, 13 and 14 show the various parts of this process.

FIG. 12 shows how a node initiates a Push update, using the following steps:

Step 1200: the node selects a link randomly from amongst its bootstrap links and enters the address of the node identified by the selected link as a forward address for a next message;

Step 1205: the node enters a small positive random number for the field hops to go in the Push message;

Step 1210: the node enters its own label and address as those of the subject node in the Push message and sends the Push message to the node at the forward address, using the network 10.

FIGS. 13 and 14 show how short range links are updated. Push messages are used together with Notify messages to update short range links. There are two phases in this updating. In a first phase, each node randomly forwards the Push message until the value in hops to go in the message as received is "0". If the value in hops to go is "0", the receiving node will start the second phase of the Push update by sending a Notify message. In the second phase, the Notify message is successively forwarded to nodes whose labels are progressively closer to the subject node's in the virtual space. If no node with a closer label can be found, then if necessary the links for the last found node are updated. This is always the case when it would otherwise be unable to find the given subject node, for instance because it had no short range links yet established. The last found node then also sends additional Notify messages to nodes that could potentially improve their link sets as well.

Referring to FIG. 13, the first phase of a Push update, dealing with incoming Push messages, involves the following steps:

Step 1300: a node receives a Push message. The Push message will contain the label and address of an initiating node as the subject node and will have a value in the field hops to go;

Step 1305: the receiving node selects a link randomly from amongst its bootstrap links and enters the address of the node identified by the selected link as a forward address for a next message;

Steps 1310 and 1315: the receiving node decreases the value in the field hops to go by 1 and checks whether the decreased value for hops to go is still greater than zero;

Step 1320: if the decreased value is still greater than zero, the node forwards the Push message to the forward address which it has entered;

Step 1325: if the value is zero, the node instead enters the label and address of the initiating node (given in the received Push message) as the subject node in a Notify message and sends the Notify message to the forward address which it has entered.

Referring to FIG. 14, the second phase of dealing with Push updates, dealing with Notify messages, involves the following steps:

Step 1400: a node receives a Notify message containing the label and address of a node as the subject node;

Step 1401: the receiving node checks whether the subject of the Notify message has the same label as the receiving node;

Step 1402: if so, the receiving node checks whether the subject of the Notify message has the same address as the receiving node. In that case it takes no further action;

If however the subject of the Notify message is a node with the same label as, but an address different from, the receiving node, then two events occur. Firstly (Step 1403) the receiving node sends to the subject node of the incoming Notify message a Notify message naming as subject a randomly-chosen node from the receiving node's own list of short-range links. Secondly, Step 1404 causes the generation of a Notify message for action by the secondary network. However, the receiving node cannot generate such a message directly. In general we prefer to avoid sending, over the communication network, messages between different virtual networks, but the main problem is that the receiving node would need not only the address of its own node of the secondary network, but also the address of the node of the secondary node that is associated with the subject node. The receiving node does not have this address. Therefore, a two-stage process is used.

First, the receiving node sends a special CrossNotify message to the node of the primary network specified as the subject in the incoming Notify message. This message contains:

a sender address, set to the address of the receiving node (i.e. the node that received the incoming (primary network) message);

a receiver (or destination) address, set to the address contained in the incoming Notify message;

a subject address, set to the address of the node of the secondary network associated with the receiving node.

Note that the first two addresses are the addresses of nodes on the primary network and the third address is the address of a node on the secondary network.

Secondly, the node of the primary network that receives the CrossNotify message, in effect, forwards it to the associated node of the secondary network. If necessary, the forwarding node could reformat the message into the format in use on the secondary network and replace the (primary network) receiver address with the address of the associated node of the secondary network. The message would then be handled just as shown in FIG. 3. The reason that we say "in effect" is that, in practice we prefer that the node of the primary network that receives the CrossNotify message just sends, to its associated node of the secondary network, a simple, local message containing the address specified in the subject field of the CrossNotify message. In that case the process of FIG. 3 would be modified to include the step of setting notify level to a suitable value.

Figure 15:
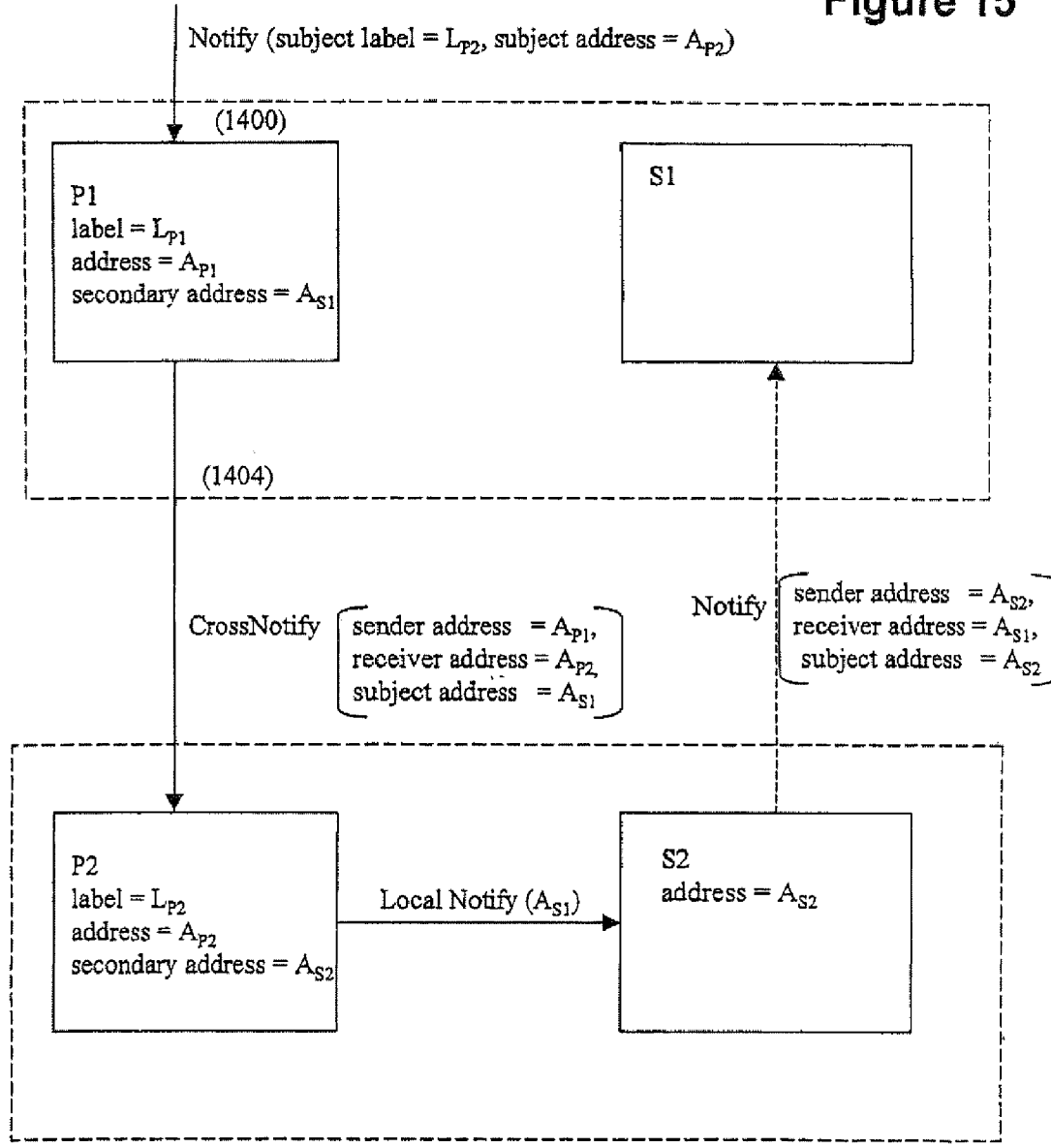

This process will be illustrated by means of an example, with reference to FIG. 15 where the boxes represent nodes and arrows represent messages. Suppose a node P1 of the primary network receives, in step 1400 of FIG. 14, a Notify message containing the label $L_{P2}$ and address $A_{P2}$ of the node P2 of the primary network as subject. At the node P1 it is recognised (Steps 1401, 1402 in FIG. 14) that the subject node has the same label as P1 (i.e. $L_{P1}=L_{P2}$) but a different address ($A_{P1} \neq A_{P2}$). The node P1 knows the address $A_{S1}$ of its secondary network node S1, and generates (at Step 1404 in FIG. 14) a CrossNotify message with sender address $A_{P1}$, receiver address $A_{P2}$ and subject address $A_{S1}$. This message is received at node P2 of the primary network and this sends a local notify message, with the address $A_{S1}$, to the associated node S2 of the secondary network. Alternatively, the node S2 of the secondary network, upon receipt of the LocalNotify message, could, instead of creating the link itself according to the process of FIG. 3, generate a further Notify message (of the secondary network) (shown by the dotted line in FIG. 12) which it sends to the node S1, naming itself as subject. The Notify message is then processed at node S1 which then uses the process of FIG. 3. This option involves an additional message but has the advantage that, when the process of FIG. 3 comes to be executed, the Notify message has actually been sent by the node whose address is in the subject field of the message, and the subject node has thus inherently been confirmed as still being in existence.

Returning now to FIG. 14: Step 1405: the receiving node translates the label of the subject node into co-ordinates and calculates which of the short range links it has recorded leads to a node label whose co-ordinates are closest to those of the subject node in virtual space. The relevant node is designated nearest node;

Step 1415: the receiving node compares the distance between its own co-ordinates and the co-ordinates for the subject node with the distance between the co-ordinates for the nearest node and the coordinates for the subject node.

If, at Step 1415, the distance between the receiving node and the subject node is found to be the same or less, the receiving node adds the label and address of the subject node as a link in its own short range link set ((step 1420): this process is further discussed below with reference to FIG. 16), sends to the subject node a Notify message which contains the label and address of the receiving node (step 1430) and sends to the nearest node a Notify message which contains the label and address of the subject node (Step 1435);

If, at Step 1415, the distance between the nearest node and the subject node is found to be greater, the receiving node reverts to Step 1435 in that it sends to the nearest node a Notify message which contains the label and address of the subject node.

Figure 16:
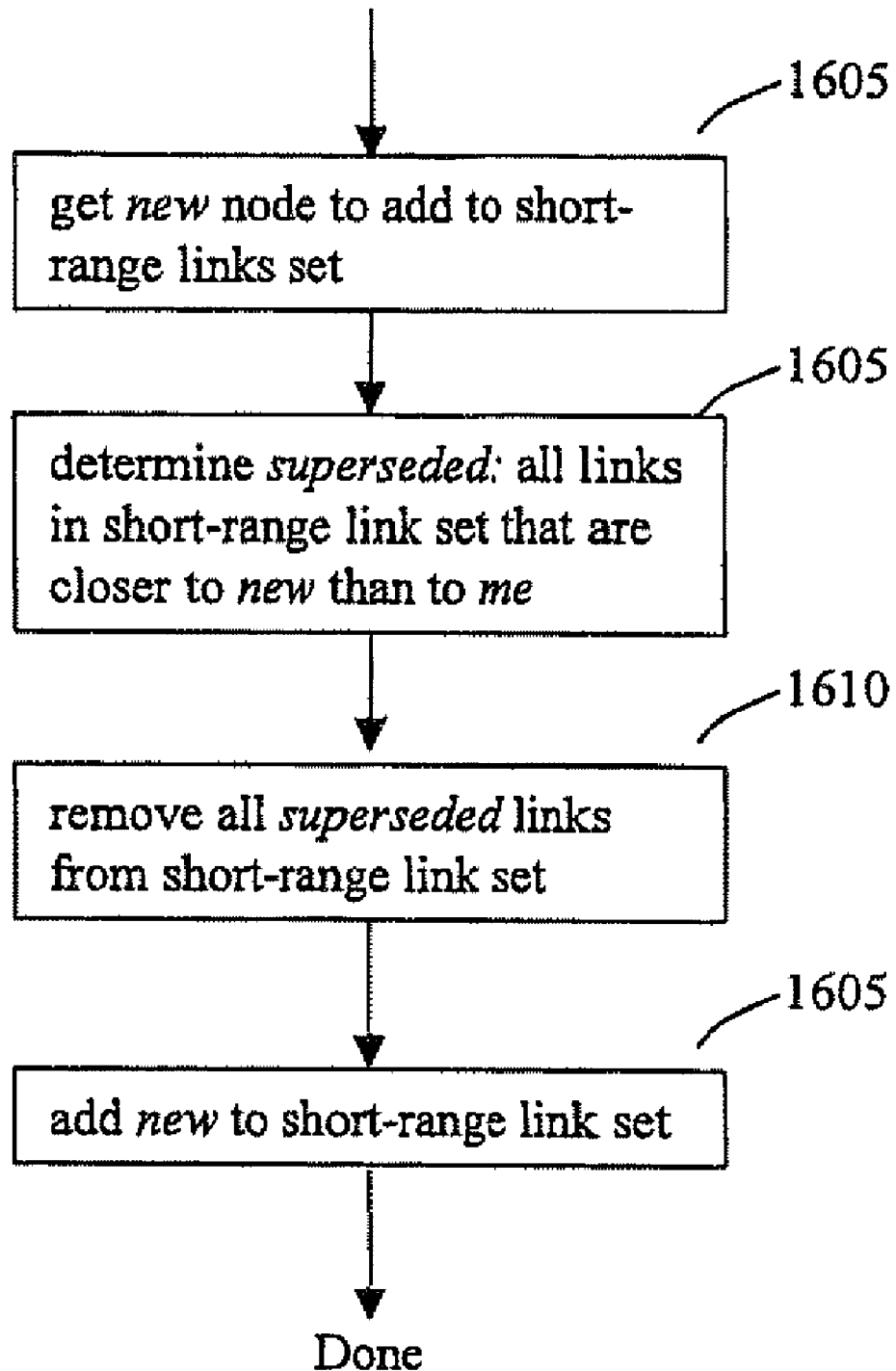

FIG. 16 shows in detail how a node behaves when it updates its short-range links. It adds the new link to its short-range links and removes all short-range links that are superseded by this link.

Referring to FIG. 16, a node may need to add a new link to its list of short range links, for instance as a result of Step 1420 in FIG. 14.

Step 1600: the updating node (that is, a node which is carrying out an update to its short range link set) has the label and address of a node for a new link;

Step 1605: the updating node identifies all existing links which are in respect of nodes which are closer to the new node than to the updating node. These identified links are to be superseded. To identify these links, the updating node calculates, for each existing link, the distances between the co-ordinates for the new node and the co-ordinates for the nodes specified in its existing links. It compares each of these distances with the distance between its own co-ordinates and the co-ordinates for the node specified in the respective existing link;

Step 1610: all links where the distance in relation to the new node is less than the distance in relation to the updating node are removed from the short range links;

Step 1620: the updating node adds a link for the new node to its short range links.

We now turn to the description of another application for this technology, namely the distributed storage of files in a peer-to-peer system. The actual nature of the files is not material to the invention: they could be text files, images, sound or video, for example. Each file is stored on a computing node, and is considered to reside in a directory of a virtual directory structure. The actual manner of the storage of a file on the computing node may be within a directory structure on that node: the local directory structure may or may not reflect the virtual directory structure, but is not material to the invention. Unless explicitly stated to the contrary, references in this description to "directories" refer to the virtual directory structure. A fundamental feature is that a file may be stored in any directory, irrespective of where it is physically stored.

The underlying idea is that one avoids any need for a hierarchical relationship between the computing nodes, or any need for centralised functionality, but the use of a fully distributed look-up system to enable access to the files and the use of a directory structure to guide users in their exploration of the available files.

Directory and Item Names

Each file, or more generally, item has a logical name that consists of two parts: a directory name and a local name for the item. Directories provide a way of grouping related items together. This grouping is only logical. Items in the same directory can be hosted on different computing nodes, and items on the same computing node can all be in different directories. The local name is used to distinguish between items in a directory, although it is possible for items in the same directory to have identical names.

Next to items, directories can also contain sub-directories. For the purposes of the present description, we assume that directories are strictly hierarchical, i.e. directories are always arranged in a tree structure. However, there is no reason why the system described here cannot support arbitrary directory structures, somewhat similar to what can be achieved using soft-links in Unix-based file systems.

Different syntaxes can be used for naming the directories and items, and from a technical point of view it does not matter too much which syntax is used. In the description below, we assume the following syntax:

IDENTIFIER=[a-zA-Z][a-zA-Z0-9]*
DIRECTORY_NAME=IDENTIFIER|(DIRECTORY_NAME "/" IDENTIFIER)
LOCAL_ITEM_NAME=IDENTIFIER
ITEM_NAME=DIRECTORY_NAME ":" LOCAL_ITEM_NAME

So an identifier starts with a letter, and consists of letters and numbers. A directory name is either a single identifier (when it is a top-level directory), or consists of multiple identifiers separated by slash characters. An item name consists of a directory name, a colon, and an identifier that represents the name of the item within the directory. For example, a valid directory name is "foo/bar/foobar" which is a sub-directory of the "foo/bar" directory. A valid item name is "foo/bar:abc", which corresponds to an item with local name "abc" in the "foo/bar" directory. Note in particular that the term "directory" refers inter alia to sub-directories. If a computing node stores one or more items within a particular directory, we speak of the computing node "hosting" that directory, but this does not imply that the computing node has a status that is different from that of other computing nodes storing items within that same directory, which also "host" the directory.

This can be clarified by an example. Table 1 shows an example configuration of a system consisting of three computing nodes, Node 1 to Node 3. Each node hosts three items. For Node 2 each item is in a different directory, whereas all items at Node 3 all reside in the "foo" directory.

TABLE 1

Example configuration of three nodes sharing various items

| location | item |
| --- | --- |
| Node 1 | foo:abc |
|  | foo:def |
|  | foo/bar:def |
| Node 2 | foo/bar:abc |
|  | tan:xyz |
|  | tan/kai:def |
| Node 3 | foo:abc |
|  | foo:ghi |
|  | foo:xyz |

Look-Up Networks

At the heart of the system are various virtual networks, for look-up purposes. Note that where reference is made to there being a look-up network for a particular purpose, it is to be understood that a lookup network will have a primary virtual network as described above, and may also have a number of secondary virtual networks.

Directory look-up network. There is only one directory look-up network, to which all computing nodes contribute. For each directory it hosts, the computing node has a local node (of a primary network) that represents that directory in the directory look-up network. The labels are generated from the directory names, and the values shown (i.e. the data that are primarily returned by the node in response to a query) are, in principle, directory locations (i.e. the address of the computing node that hosts the directory). Given the addressing scheme that is used here, there is no need to associate a value with the primary network node because Found messages returned in response to Find queries include the address of the node, so the address of the directory node associated with the primary network node can be derived from the address of the latter. When a different addressing scheme is used (that does not provide the ability to deduce addresses) the value associated with nodes in the primary directory look-up network would be the address of the corresponding directory node. Every computing node is responsible for publishing the directories that it hosts. The purpose of the directory look-up network is to enable one, given a directory name, to identify one computing node that hosts that directory. The use of secondary networks is not essential for item retrieval, but in this example these are provided to permit listings of directory contents to be generated, as described later on.

Table 2 shows the contents of the directory look-up network for the above example. In this case the "value" column is blank because—as we will describe—with the addressing scheme used in this example the address can be deduced from the address of the directory node (which is returned). Although the directory contents are listed in a single table, the actual look-up network is a primary virtual network distributed across the three nodes. There is a virtual node for each row in the table, which resides on the computing node listed in the "location" column.

TABLE 2

Directory look-up network

| label = hash of | Value | Location |
|---|---|---|
| tan | | Node 2 |
| tan/kai | | Node 2 |
| foo | | Node 1 |
| foo | | Node 3 |
| foo/bar | | Node 1 |
| foo/bar | | Node 2 |

Note that a computing node is considered to host a directory only if it has items in that directory. Thus Node 2 does not need a directory node for the foo directory because (even though it hosts the subdirectory foolbar) it does not host any items in that directory.

Subdirectory look-up network. There is only one subdirectory look-up network, to which all computing nodes contribute. For each directory it hosts, a computing node publishes a subdirectory entry for that directory. The labels are generated from the name of the parent directory. The value associated with each entry is the name of the sub-directory. For instance, directory "foo/bar" at Node 1, would publish a subdirectory entry with value "foo/bar" under the label "foo" and this would be hosted at Node 1. This subdirectory entry takes the form of a node of the primary virtual network and a node of a secondary virtual network. In consequence, the Subdirectory look-up network has one primary virtual network and as many secondary virtual networks as there are directories which have subdirectories within them (including the root or null directory in which all the top-level directories reside).

Table 3 shows the contents of the subdirectory look-up network. Once again, all three nodes contribute to this network.

TABLE 3

Subdirectory look-up network

| label = hash of | Value | Location |
|---|---|---|
| (empty) | foo | Node 1 |
| (empty) | tan | Node 2 |
| (empty) | foo | Node 3 |
| tan | tan/kai | Node 2 |
| foo | foo/bar | Node 1 |
| foo | foo/bar | Node 2 |

Item look-up networks. There is one item look-up network for each directory in the system, to which only the nodes that host items in that directory contribute. The labels are the hash of the local item names, and the values are item locations. For each item it hosts, a computing node publishes the location of the item in the item look-up network for the directory that the item resides in. The purpose of the item look-up network is to enable one, given a item name, to identify the computing node that hosts that item. Thus the item look-up network does not include any secondary networks, though these could be provided were it desired for some reason to identify more than one source for a particular item.

Note that it would be possible to have a single item look-up network. In that case, the label would be the hash of the full item name (i.e. including the directory name). However, this becomes inefficient for large systems.

Tables 4 to 7 show the contents of each of the item look-up networks. The number of computing nodes that contribute to a particular network depends on how many nodes host items in the directory that the look-up network corresponds to. For instance, only Node 2 hosts an item in directory "tan" so it is the only computing node that contributes to the "tan" item look-up network, as can be seen in Table 4.

TABLE 4

Item look-up network for "tan" directory

| label = hash of | value | Location |
|---|---|---|
| xyz | | Node 2 |

TABLE 5

Item look-up network for "tan/kai" directory

| label = hash of | value | Location |
|---|---|---|
| def | | Node 2 |

TABLE 6

Item look-up network for "foo" directory

| label = hash of | value | Location |
|---|---|---|
| abc | | Node 1 |
| abc | | Node 3 |
| def | | Node 1 |
| ghi | | Node 3 |
| xyz | | Node 3 |

TABLE 7

Item look-up network for "foo/bar" directory

| label = hash of | value | location |
|---|---|---|
| abc | | Node 2 |
| def | | Node 1 |

Figure 17:
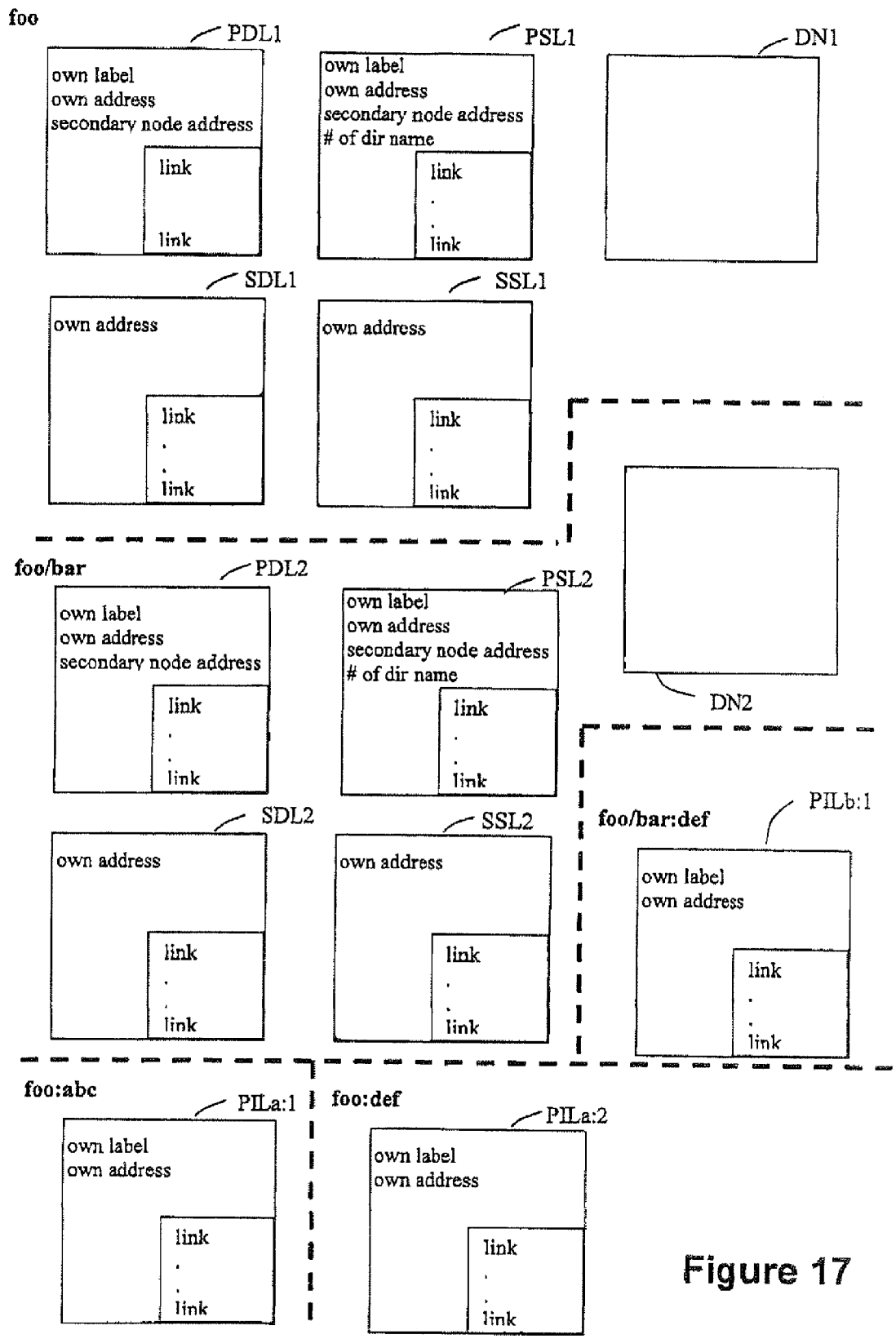
FIG. 17 is a schematic diagram showing nodes assigned to directories and files.

Before describing the operation of lookup processes, the anatomy of a computing node will be explained in more detail with reference to FIG. 17, which explicitly shows the nodes present on Node 1 of the example given above. As discussed earlier, every node could if desired have a distinct address unrelated to the addresses of other nodes. Here however we envisage the following addressing protocol, using ports in the manner discussed above. Thus the computing node has one IP address and four ports (i.e. four network addresses in total):

one port (the Primary port) receives all messages destined for a node of a primary virtual network. Such a node has an address consisting of a IP address, port number and node identifier.

Another port (the secondary port) receives all messages destined for a node of a secondary virtual network. Such a node has an address consisting of a IP address, port number and node identifier.

Another port (the Directory port) receives all messages destined for a directory node. Such a node has an address consisting of a IP address, port number and node identifier. We envisage the port number would be the same throughout the system, and that the node identifier would be the hash of the full directory name, so that, given the address of the computing node and the name of the directory one can deduce the address of the Directory node.

Another port (the Item port) receives all messages destined for an Item node. Such a node has an address consisting of a IP address, port number and node identifier. We envisage that the port number would be the same throughout the system, and that the node identifier would be the hash of the full item name, so that, given the address of the computing node and the name of the item one can deduce the address of the Directory node.

Each directory has associated with it a node of the primary virtual network of the directory look-up network; thus the directory foo has a primary directory look-up node PDL1.

a node of the secondary virtual network of the directory look-up network; thus the directory foo has a secondary directory look-up node SDL1.

a Directory node, in the case of foo this is DN1.

a node of the primary virtual network of the sub-directory look-up network; thus the directory foo has a primary sub-directory look-up node PSL1.

a node of the secondary virtual network of the sub-directory look-up network; thus the directory foo has a secondary sub-directory look-up node SSL1.

Similarly the directory foo/bar has nodes PDL2, SDL2, PSL2, SSL2, DN2.

Each item has associated with it:

a node of the primary virtual network of the item look-up network for the directory that the item is in. Thus the item foo:abc has a primary item look-up node PILa:1 and the item foo:def has a primary item look-up node PILa:2. Both these nodes belong to the same primary virtual network, that for directory foo. The item foo/bar: def has a primary item look-up node PILb:1 which belongs to a different primary virtual network, that for the directory foobar.

an Item node; thus the item foo:abc has associated with it a node IN1, item foo:def has an item node IN2, and item foo/bar:def has an item node IN3.

A primary directory lookup node is defined by the following stored data:

Its own label.
Its own address.
A list of links
Application-specific data, namely the address of the corresponding secondary node.

The messages received by such a node, and the responses which it generates have already been described.

A secondary directory look-up node is defined by the following data:

Its own address.
A list of links

The messages received by such a node, and the responses which it generates have already been described.

A primary sub-directory lookup node is defined by the following stored data:

Its own label.
Its own address.
A list of links
Application-specific data, namely the hash of the directory name it represents (e.g. the hash "tan/kai" for the fourth row in Table 3), or optionally the relatively name of the directory if it is short enough (e.g. "kai"). The latter has the advantage that no additional message to the directory node is required to establish the name of the directory. and the address of the corresponding secondary node.

The messages received by such a node, and the responses which it generates have already been described.

A secondary sub-directory look-up node is defined by the following data:

Its own address.
A list of links

The messages received by such a node, and the responses which it generates have already been described.

A Directory node is defined by the following data:
The name of the directory
A list of the items in the directory that are locally hosted
It is able to respond to the following messages by the generation of replies as follows:

| Incoming message | Reply message |
|---|---|
| GetSummary | Summary |
| GetContents | Contents - a list of the local names of items in the directory |
| GetSecondaryNodeAddress | SecondaryNodeAddress address of the node in the directory look-up network (so SDL1 for DN1) |

An Item node is defined by the following data:
The name of the item
The data size of the item (in bytes)
The hash over the contents of the item (this can be used to quickly establish whether or not two large items on different computing nodes are the same without downloading them first)
The location of the item on the physical storage (so that its data can be retrieved in response to download requests).

It is able to respond to the following messages by the generation of replies as follows:

| Incoming message | Reply message |
| --- | --- |
| GetSummary | summary data for the item (full name, length, date, etc.) |
| GetContents | the item itself |

Item Retrieval

Figure 18:
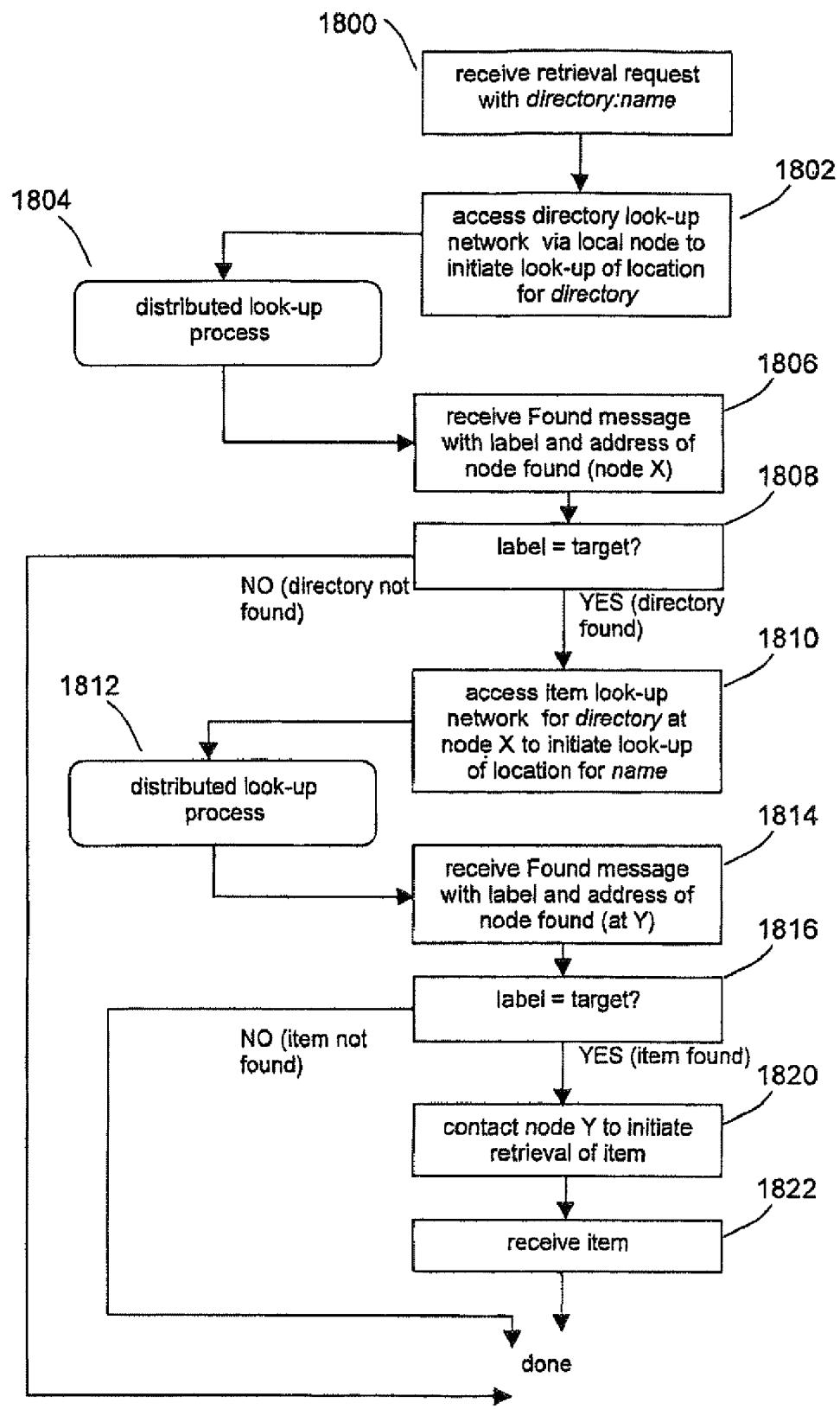
FIGS. 18 to 20 are further flowcharts.

FIG. 18 is a flowchart of a process, to be executed at a computing node to enable the retrieval of an item, given its name. This is essentially a two-stage process, firstly to use the directory look-up network to identify a computing node that hosts the directory that the item is in, and secondly to use the item look-up network to find the computing node that hosts the item sought. Note that this process does not utilise any secondary virtual network.

Of course, when the location of a computing node that hosts a given directory is already known, the first step can be omitted. This means that the retrieval of many items in the same directory can be done efficiently as the directory look-up has to be performed only once. Additionally, item look-up networks are relatively small, and only involve a proportion of the computing nodes, so that the item look-up process can be performed relatively quickly.

The process is initiated by a request for retrieval of an item. This could be input manually, or be generated by a program that needs the item. Either way, at Step 1800 a retrieval request specifying the item directory:name is received at a computing node. In FIG. 18, operations performed at the computing node that received the request are shown in rectangular boxes; operations performed mainly or solely at other nodes are shown in rounded boxes. Here it is assumed that the computing node that received the request hosts at least one virtual directory and therefore contains a node of the primary directory look-up network. Thus reference will be made to "local" messages (i.e. a method or function call) to this virtual node. If, however the computing node does not host a virtual directory, the messages can instead be sent to one that does.

At Step 1802, the computing node generates a local Find message and sends it to a node of the primary directory look-up network. In the case of Node1 shown in FIG. 17 this would be the node PDL1 or PDL2: it does not matter which. We suppose that it is PDL1. This Find message contains, as target label, the hash of directory.

This results, at Step 1804, in the execution of a distributed look-up process as described above with reference to FIG. 11, resulting in a Found message containing the label and address of the node that was found. This message is received 1806 at the node (e.g. PDL1) that sent the Find message. At Step 1808 it is checked whether the label returned matches that of the target and if not, the process terminates as unsuccessful. If all is well, then the address of a computing node (say, node X) hosting the desired directory is then known (being the leading part of the address returned by the Found message).

The next step is to initiate a look-up on the item look-up network of the desired directory. Thus, at Step 1810, a further Find message, specifying as target the hash of the item name is generated and sent to the computing node X just identified. In fact, this message has to reach one of the item look-up nodes at X. Different ways of achieving this will be described shortly.

Again this Find message initiates at 1812 a distributed look-up process as in FIG. 11 and results in a Found message being received (1814) at the item look-up node which then forwards it to the computing node that initiated the query. The way it is described here, a node of a primary network can accept external Find queries, which are queries from nodes that are not part of the same primary network (or even from nodes that do not belong to a primary network). In this case, if it receives a query, it would locally maintain a record for the query, which includes the address where it should send a reply to (i.e. the address of the computing node that initiated the query).

When it receives a Found message, it finds the corresponding query record and forwards the message and deletes the query record. If a query times out (i.e. no Found message was received in time), its query record is also deleted. It can find the query that corresponds to a given Found message by way of the label of the target node that is included in the message.

Alternatively, the computing node that initiates the query could do so by sending, over a primary network, a Find message itself (to the item look-up node at X). In this case, it can set the reply address such that the resulting Found message is directly sent to itself (without going by way of the item look-up node at X). Note that in this case the Find message is not initiated from a primary node (or at least, not from a primary node that is part of the same look-up network), however, this does not matter as long it can handle Found messages appropriately.

As before, the Found message is checked (1816) to see that the label returned matches that of the target, and if not, the process terminates.

If a match is obtained then the address contained in the Found message is that of the item look-up node associated with the wanted item. In order to retrieve the item itself, however, the address of the item node is needed. This address could be held by the item look-up node and returned in the Found message, but with the addressing protocol used in this example that is not necessary, as the required address can be generated from the item look-up node address simply be replacing the port number with the port number of the item port.

The next step (1820) is to send a message to this address requesting retrieval of the item itself, which is then duly received at Step 1822.

In the above description, we omitted to indicate how, having received a Find message at 1806 from a computing node hosting directory, one can obtain the address of an item look-up node for that directory, to which to send the Find message at Step 1810. Probably the simplest method is to provide that each primary directory look-up node (such as PDL1, PDL2) also contains, as additional application-specific data, the address of such a node; for example the node PDL1 for the foo directory could contain the address of the item look-up node PILa:1 (or PILa:2). The Find message could then return this address which could then be inserted directly into the Find message generated at Step 1810, as destination address.

A more sophisticated solution (assuming the addressing protocol described above) is to take the primary directory look-up node address returned by the Found message at 1806 and translate it into the address of the associated directory node by changing the port number to the number of the directory port and changing the node identifier to the hash of the directory name. If each directory node has a list of item look-up nodes, at that computing node, for that directory, the Find message at Step 1810 can then be sent to the directory node with this address (i.e. at node X) which then forwards it to one of its item look-up nodes.

Browsing the Directories

Figure 19:
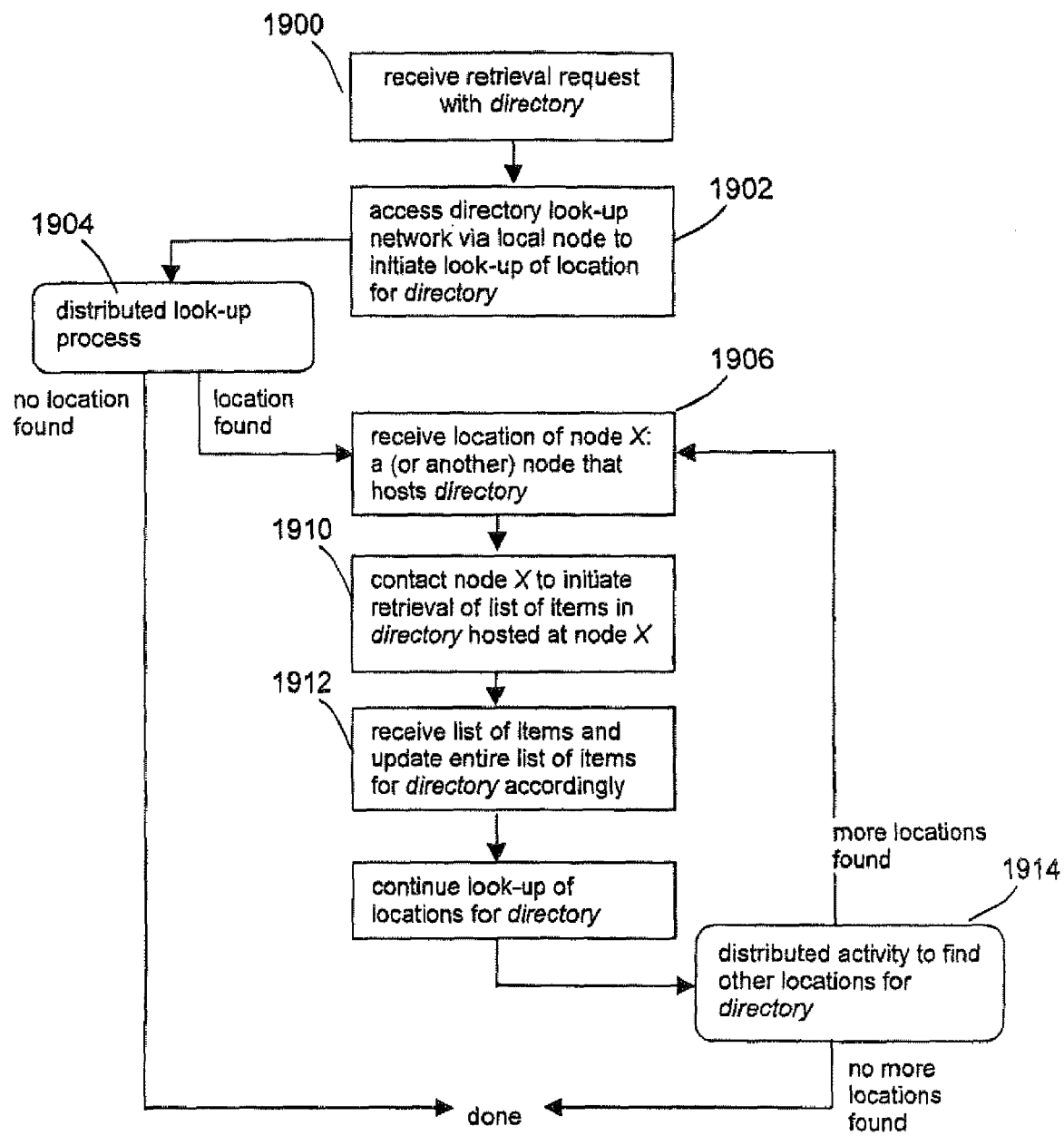

FIG. 19 is a flowchart of a process, to be executed at a computing node to generate a listing of items stored within a directory. This uses the primary directory look-up network to identify a computing node that hosts the directory in question, to obtain a list of items that that computing node has for that directory, and then—repeatedly if necessary—uses the secondary directory look-up network to find further computing nodes that host the directory.

At Step 1900 a retrieval request specifying directory is received at a computing node.

At Step 1902, the computing node generates a local Find message and sends it to a node of the primary directory look-up network. This Find message contains, as target label, the hash of directory.

This results, at Step 1904, in the execution of a distributed look-up process as described above with reference to FIG. 11, resulting in a Found message containing the label and address of the node that was found. This message is received 1906 at the node that sent the Find message. For simplicity of representation, the label match check analogous to that performed at Step 1808 in FIG. 18 it considered to occur inside box 1904).

The next step (1910) is to send to the found computing node a GetContent message for action by the its directory node corresponding to directory. The required destination address is generated from the directory look-up node address returned by the Found message at 1906 by changing the port number to the number of the directory port and changing the node identifier to the hash of the directory name.

The directory node responds with a list of items in the directory. Upon receipt at Step 1912, the item names on this list are copied into a results list.

In order to assemble a complete list of items in the directory, it is of course necessary to interrogate other nodes that host directory. The search for these makes use of the secondary directory look-up network, and it is for this reason that each primary directory look-up node contains the address of its associated node of the secondary directory lookup network (e.g. the node SDL1 or SDL2 in FIG. 18), which is also returned by the Found message that it sent. A search of the secondary directory look-up network is performed at Step 1914. This is the same process as has already been described with reference to FIG. 10. Although it would be possible to run the FIG. 10 process to its conclusion, to find all computing nodes hosting directory, in this example the process of FIG. 10 is suspended as soon as it enters a new node into the "confirmed" list. [possibly mark FIG. 10 with suspend and resume points]. Once another secondary directory lookup node is found, control returns to Step 1906 where the address of this node is used in the same manner as before. When the process again reaches Step 1914, the search process of FIG. 10 is resumed, and this cycle is repeated until no more node hosting directory can be found. When this point is reached, the results list will contain a full list of items held in the directory in question, irrespective of where they are stored.

The figure shows a sequential algorithm. In practice, an implementation would be partially parallel. For instance, multiple computing nodes would be contacted concurrently to obtain their list of items in a given directory. Additionally, there is no need to wait for the process to complete before showing the user the directory listing. The directory listing can be shown as it is being built. This allows the user to start looking through the directory. She can then start retrieving items that take her fancy.

Figure 20:
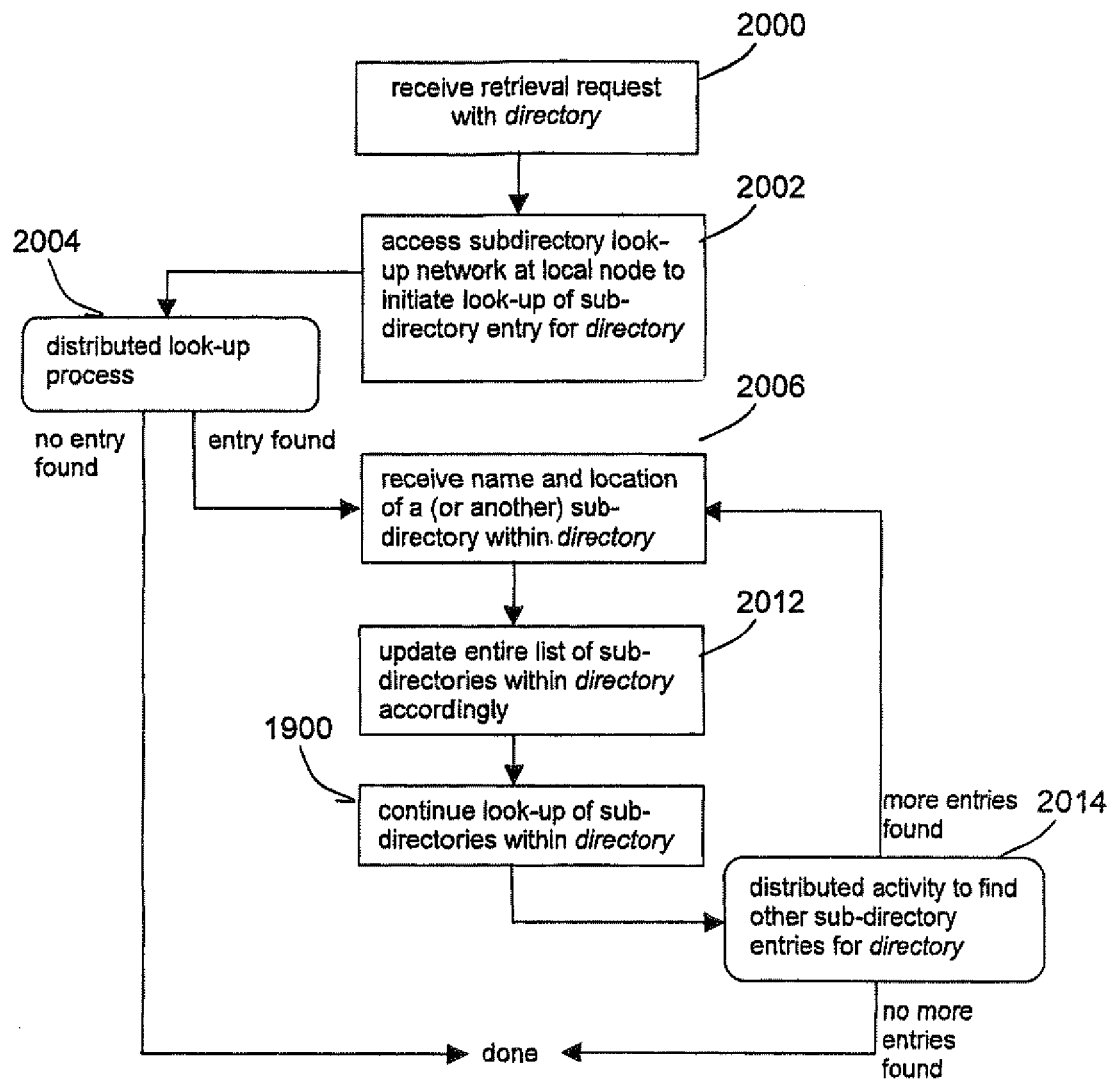

FIG. 20 shows how a listing of subdirectories within a given directory is obtained. It is similar to FIG. 19 but differs because the subdirectory look-up network is used instead of the directory look-up network. It comprises Steps 2000 to 2014 analogous to Steps 1900 to 1914 in FIG. 19. Step 2004 uses the primary subdirectory look-up network and Step 2014 uses the secondary subdirectory look-up network. However there is no counterpart to Step 1910, as there is no need to contact directly the node that hosts a given sub-directory because all required information (i.e. the name and location of the sub-directory) is available at the relevant nodes of the subdirectory.

Note that to get the entire contents of a directory (i.e. the items and sub-directories in it) one would execute both processes in FIG. 19 and FIG. 20. One could do this consecutively, or in parallel. However, the algorithms in FIG. 19 and FIG. 20 are not necessarily always used in conjunction. For instance, to fetch the entire virtual directory tree that is used, one needs only to execute FIG. 20 repeatedly.

What is claimed is:

1. A distributed computer system comprising:
   a plurality of computers, each computer storing data items, each data item being assigned to one of a plurality of virtual directories;
   each computer that has a said data item stored thereon having at least one node of a virtual network for directory look-up, said node for directory look-up comprising
   (i) data identifying that one of the plurality of virtual directories with which the node for directory look-up is associated,
   (ii) linking data comprising addresses of other such nodes for directory look-up, and
   (iii) software operable
      (a) in response to an enquiry message that identifies another of the virtual directories forwarding the message to another node for directory look-up of the network, and
      (b) in response to an enquiry message that identifies the virtual directory with which the node for directory look-up is associated, generating a reply message identifying a computer that the node for directory look-up is located on;
   each computer that has a said data item stored thereon having, for each item stored thereon, a node of a virtual network for item look-up, said node for item look-up comprising
   (i) data identifying the item with which the node for item look-up is associated,
   (ii) linking data comprising addresses of other such nodes for item look-up each associated with an item assigned to the same virtual directory, whereby said linking data together define a plurality of virtual networks for item look-up, each of which networks corresponds to a respective different virtual directory, and
   (iii) software operable
      (a) in response to an enquiry message that identifies another of the items, forwarding the message to another node for item look-up of the network, and
      (b) in response to an enquiry message that identifies the item with which the node for item look-up is associated, generating a reply message including the identified item; and
   wherein at least one computer has retrieval means, responsive to receipt of a query identifying a directory and an item within that directory, to
   (i) send to a node of the virtual network for directory look-up an enquiry message identifying the directory, (ii) upon receipt of a reply message thereto, to send to the computer identified in the reply message an enquiry message identifying the item, and (iii) to receive the reply message containing the item, in which each computer having retrieval means includes also secondary retrieval means operable (a) upon receipt of a reply message identifying a computer having one or more items in a particular directory to identify further computers having one or more items in that directory; and (b) to create a list of items in that directory.

2. A computer system according to claim 1, wherein each computer that has a said data item stored thereon also has at least one node of a secondary virtual network for directory look-up, such that said nodes of a secondary virtual network for directly look-up together form a respective secondary virtual network for each virtual directory, wherein said node of a secondary virtual network for directory look-up comprising a data storage area for containing a list of addresses of other nodes of the secondary virtual network that have items in the same directory and said node of a secondary virtual network for directory look-up is responsive to enquiry messages to return a message containing the addresses of the list; and wherein the secondary retrieval means is operable, for identifying further computers having one or more items in the directory in question, to send an enquiry message to the node identified by the reply message and upon receipt of a response to iteratively send enquiry messages to addresses contained in the response to that enquiry message or in a response to a subsequent enquiry message.

3. A distributed computer system comprising:

a plurality of computers, each computer storing data items, each data item being assigned to one of a plurality of virtual directories;

each computer that has a said data item stored thereon having at least one node of a virtual network for directory look-up, said node for directory look-up comprising (i) data identifying that one of the plurality of virtual directories with which the node for directory look-up is associated, (ii) linking data comprising addresses of other such nodes for directory look-up, and (iii) software operable (a) in response to an enquiry message that identifies another of the virtual directories forwarding the message to another node for directory look-up of the network, and (b) in response to an enquiry message that identifies the virtual directory with which the node for directory look-up is associated, generating a reply message identifying a computer that the node for directory look-up is located on;

each computer that has a said data item stored thereon having, for each item stored thereon, a node of a virtual network for item look-up, said node for item look-up comprising (i) data identifying the item with which the node for item look-up is associated, (ii) linking data comprising addresses of other such nodes for item look-up each associated with an item assigned to the same virtual directory, whereby said linking data together define a plurality of virtual networks for item look-up, each of which networks corresponds to a respective different virtual directory, and (iii) software operable (a) in response to an enquiry message that identifies another of the items, forwarding the message to another node for item look-up of the network, and (b) in response to an enquiry message that identifies the item with which the node for item look-up is associated, generating a reply message including the identified item; and wherein at least one computer has retrieval means, responsive to receipt of a query identifying a directory and an item within that directory, to (i) send to a node of the virtual network for directory look-up an enquiry message identifying the directory, (ii) upon receipt of a reply message thereto, to send to the computer identified in the reply message an enquiry message identifying the item, and (iii) to receive the reply message containing the item, wherein some of said directories are assigned, as subdirectories, to another of said directories and wherein each computer having retrieval means also includes:

(a) first subdirectory retrieval means responsive to input of a directory name to identify a computer having items in at least one subdirectory assigned to that directory; and (b) second subdirectory retrieval means connected to receive an address identified by the first subdirectory retrieval means and operable in response thereto to identify further computers having items in at least one subdirectory assigned to the same directory.

4. A computer for use in a distributed computer system comprising a plurality of computers, said computer comprising:

a data store which stores data items, each data item being assigned to one of a plurality of virtual directories;

at least one node of a virtual network for directory look-up, said node for directory look-up comprising (i) data identifying that one of the plurality of virtual directories with which the node for directory look-up is associated, (ii) linking data comprising addresses of other such nodes for directory look-up, and (iii) software operable (a) in response to an enquiry message that identifies another of the virtual directories forwarding the message to another node for directory look-up of the network, and (b) in response to an enquiry message that identifies the virtual directory with which the node for directory look-up is associated, generating a reply message identifying a computer that the node for directory look-up is located on;

for each item stored thereon, a node of a virtual network for item look-up, said node for item look-up comprising (i) data identifying the item with which the node for item look-up is associated, (ii) linking data comprising addresses of other such nodes for item look-up each associated with an item assigned to the same virtual directory, whereby said linking data together define a plurality of virtual networks for item look-up, each of which networks corresponds to a respective different virtual directory, and (iii) software operable (a) in response to an enquiry message that identifies another of the items, forwarding the message to another node for item look-up of the network, and (b) in response to an enquiry message that identifies the item with which the node for item look-up is associated, generating a reply message including the identified item; and retrieval means, responsive to receipt of a query identifying a directory and an item within that directory, to
(i) send to a node of the virtual network for directory look-up an enquiry message identifying the directory,
(ii) upon receipt of a reply message thereto, to send to the computer identified in the reply message an enquiry message identifying the item, and
(iii) to receive the reply message containing the item, including also secondary retrieval means operable:
(a) upon receipt of a reply message identifying a computer having one or more items in a particular directory to identify further computers having one or more items in that directory; and
(b) to create a list of items in that directory.

5. A computer for use in a distributed computer system comprising a plurality of computers, said computer comprising:
a data store which stores data items, each data item being assigned to one of a plurality of virtual directories;
at least one node of a virtual network for directory look-up, said node for directory look-up comprising
(i) data identifying that one of the plurality of virtual directories with which the node for directory look-up is associated,
(ii) linking data comprising addresses of other such nodes for directory look-up, and
(iii) software operable
(a) in response to an enquiry message that identifies another of the virtual directories forwarding the message to another node for directory look-up of the network, and
(b) in response to an enquiry message that identifies the virtual directory with which the node for directory look-up is associated, generating a reply message identifying a computer that the node for directory look-up is located on;
for each item stored thereon, a node of a virtual network for item look-up, said node for item look-up comprising
(i) data identifying the item with which the node for item look-up is associated,
(ii) linking data comprising addresses of other such nodes for item look-up each associated with an item assigned to the same virtual directory, whereby said linking data together define a plurality of virtual networks for item look-up, each of which networks corresponds to a respective different virtual directory, and
(iii) software operable
(a) in response to an enquiry message that identifies another of the items, forwarding the message to another node for item look-up of the network, and
(b) in response to an enquiry message that identifies the item with which the node for item look-up is associated, generating a reply message including the identified item; and
wherein at least one computer has retrieval means, responsive to receipt of a query identifying a directory and an item within that directory, to
(i) send to a node of the virtual network for directory look-up an enquiry message identifying the directory,
(ii) upon receipt of a reply message thereto, to send to the computer identified in the reply message an enquiry message identifying the item, and
(iii) to receive the reply message containing the item, wherein some of said directories are assigned, as subdirectories, to another of said directories and wherein the computer also includes:
(a) first subdirectory retrieval means responsive to input of a directory name to identify a computer having items in at least one subdirectory assigned to that directory; and
(b) second subdirectory retrieval means connected to receive an address identified by the first subdirectory retrieval means and operable in response thereto to identify further computers having items in at least one subdirectory assigned to the same directory.

6. A computer according to claim 5 in which the retrieval means is operable to compile a composite list of said subdirectories.

7. A distributed computer system comprising:
a plurality of computers, wherein each computer stores data items, each data item being assigned to one of a plurality of virtual directories;
first retrieval means responsive to input of a directory name to identify a computer having items in the directory whose name is input;
second retrieval means connected to receive an address identified by the first retrieval means and operable in response thereto to identify further computers having items in the directory whose name is input;
wherein each computer having items in a given directory has associated with it a data storage area for containing addresses for other computers having items in the same directory and is responsive to enquiry messages to return a message containing the addresses of the list; and
wherein the second retrieval means is operable to send an enquiry message to the computer identified by the first retrieval means and upon receipt of a response to iteratively send enquiry messages to addresses contained in the response to that enquiry message or in a response to a subsequent enquiry message, thereby identifying a plurality of computers having items in the directory in question,
wherein the first retrieval means is formed by a primary network of virtual nodes, each node being defined by a list of links to other nodes of the primary network, each link in the list including a label and address of a respective other node; and
each node includes (i) means responsive to receipt of a request message containing a label to propagate the request message within the network, and (ii) means responsive to receipt of a request message containing a label matching the label of the node receiving it to generate a reply message.

8. A distributed computer system according to claim 7 in which the retrieval means is operable to retrieve from each of said identified plurality of computers a list of items stored thereon, and to compile a composite list of said items.

9. A distributed computer system according to claim 7 wherein some of said directories are assigned, as subdirectories, to another of said directories and wherein each computer having retrieval means also includes:
first subdirectory retrieval means responsive to input of a directory name to identify a computer having items in at least one subdirectory assigned to the directory whose name is input; and
second subdirectory retrieval means connected to receive an address identified by the first subdirectory retrieval means and operable in response thereto to identify further computers having items in at least one subdirectory assigned to the directory whose name is input.

10. A distributed computer system according to claim 7, in which the second retrieval means is formed by a secondary network of virtual nodes, each node being defined by a list of links to other nodes of the secondary network, each link in the list including an address of a respective other node; and wherein each node includes means responsive to receipt of a request message to generate a reply message containing the addresses of the list.

11. A distributed computer system according to claim 10 in which each node of the secondary network includes processing means programmed to perform the following operations:
receiving messages;
responding to messages requesting information about the contents of the list;
complying with received requests to remove an address from the list and insertion of another address into the list; and
in response to receipt of a message requesting a link between the node and a second node:
  (A) generating a message to the second node requesting information about the contents of its list;
  (B) determining whether both the first node and second node has in each case a number of addresses in its list which is less than the predetermined number;
  (C) in the event that this condition is satisfied, inserting into its list the address of the second node and generating a message to the second node requesting the second node to add to its list the address of the node;
  (D) in the event that this condition is not satisfied, determining whether the node has a number of addresses in its list which is at least two less than the predetermined number, and if so
    (a) selecting from the list of the second node the address of a third node;
    (b) inserting the address of the second node into the list of the first node and inserting the address of the third node into the list of the first node;
    (c) generating a message to the second node requesting the removal of the address of the third node from the list of the second node and insertion of the address of the node; and
    (d) generating a message to the third node requesting the removal of the address of the second node from the list of the third node and insertion of the address of the node.

12. A distributed computer system according to claim 7 in which the second retrieval means is formed by a secondary network of virtual nodes, each node being defined by a list of links to other nodes of the secondary network, each link in the list including an address of a respective other node; and wherein each node includes means responsive to receipt of a request message to generate a reply message containing the addresses of the list; and
in which the reply message generated by a node of the primary network includes the address of that node of the secondary network which is associated with the node generating the reply message.

13. A distributed computer system according to claim 7, wherein
the second retrieval means is formed by a secondary network of virtual nodes, each node being defined by a list of links to other nodes of the primary network, each entry in the list including an address of the respective other node; and wherein each node includes means responsive to receipt of a request message to generate a reply message containing the addresses of the list;

each node of the primary network includes means operable to initiate and to propagate exploratory messages each containing the label and address of the initiating node of the primary network; and
each node is operable upon receipt of an exploratory message containing a label matching that of the receiving node and an address not matching that of the receiving node to generate a notification message for addition of a link to the secondary network, said notification message identifying the node initiating the exploratory message and containing the address of the node of the secondary network associated with the receiving node.

14. A distributed computer system according to claim 13, in which the notification message contains, as destination, the address of the initiating node, and the initiating node is operable upon receipt thereof to forward to the node of the secondary network associated with the initiating node a message requesting addition of a link between it and the node having the address contained in the notification message.

15. A distributed computer system, said system comprising:
a plurality of computers, each storing data items, each data item being assigned to one of a plurality of virtual directories;
each computer that has a said data item stored thereon having at least one node of a virtual network for directory look-up, said node for directory look-up comprising
(i) data identifying that one of a plurality of the virtual directories with which the node for directory look-up is associated,
(ii) linking data comprising addresses of other such nodes for directory look-up, and
(iii) software operable
  (a) in response to an enquiry message that identifies another of the virtual directories forwarding the message to another node for directory look-up of the network, and
  (b) in response to an enquiry message that identifies the virtual directory with which the node for directory look-up is associated, generating a reply message identifying a computer that the node for directory look-up is located on,
each computer that has a said data item stored thereon having, for each item stored thereon, a node of a virtual network for item look-up said node for item look-up comprising
(i) data identifying the item with which the node for item look-up is associated,
(ii) linking data comprising addresses of other such nodes for item look-up each associated with an item assigned to the same virtual directory, whereby said linking data together define a plurality of virtual networks for item look-up, each of which networks corresponds to a respective different virtual directory, and
(iii) software operable
  (a) in response to an enquiry message that identifies another of the items forwarding the message to another node for item look-up of the network,
  (b) in response to an enquiry message that identifies the item with which the node for item look-up is associated, generating a reply message identifying the computer that the node for item look-up is located on, and
  (c) in response to a request message that identifies the item with which the node for item look-up is associated, generating a reply message including the item, and wherein at least one computer has retrieval means responsive to receipt of a query identifying a directory and an item within that directory to
  (i) send to a node of the virtual network for directory took-up an enquiry message identifying the directory,
  (ii) upon receipt of a reply message thereto, to send to the computer identified in the reply message an enquiry message identifying the item, and
  (iii) upon receipt of a reply message thereto, to send to the computer identified in the reply message a message requesting the item,
in which each computer having retrieval means includes also secondary retrieval means operable
  (a) upon receipt of a reply message identifying a computer having one or more items in a particular directory to identify further computers having one or more items in that directory, and
  (b) to create a list of items in that directory.

16. A distributed computer system, said system comprising:
  a plurality of computers, each storing data items, each data item being assigned to one of a plurality of virtual directories;
  each computer that has a said data item stored thereon having at least one node of a virtual network for directory look-up, said node for directory look-up comprising
    (i) data identifying that one of a plurality of the virtual directories with which the node for directory look-up is associated,
    (ii) linking data comprising addresses of other such nodes for directory look-up, and
    (iii) software operable
      (a) in response to an enquiry message that identifies another of the virtual directories forwarding the message to another node for directory look-up of the network, and
      (b) in response to an enquiry message that identifies the virtual directory with which the node for directory look-up is associated, generating a reply message identifying a computer that the node for directory look-up is located on;
  each computer that has a said data item stored thereon having, for each item stored thereon, a node of a virtual network for item took-up, said node for item book-up comprising
    (i) data identifying the item with which the node for item look-up is associated,
    (ii) linking data comprising addresses of other such nodes for item look-up each associated with an item assigned to the same virtual directory, whereby said linking data together define a plurality of virtual networks for item look-up, each of which networks corresponds to a respective different virtual directory, and
    (iii) software operable
      (a) in response to an enquiry message that identifies another of the items, forwarding the message to another node for item look-up of the network,
      (b) in response to an enquiry message that identifies the item with which the node for item look-up is associated, generating a reply message identifying a computer that the node for item look-up is located on; and
      (c) in response to a request message that identifies the item with which the node for item took-up is associated, generating a reply message including the item; and wherein at least one computer has retrieval means responsive to receipt of a query identifying a directory and an item within that directory to
  (i) send to a node of the virtual network for directory took-up an enquiry message identifying the directory,
  (ii) upon receipt of a reply message thereto, to send to the computer identified in the reply message an enquiry message identifying the item, and
  (iii) upon receipt of a reply message thereto, to send to the computer identified in the reply message a message requesting the item,
wherein some of said directories are assigned, as subdirectories, to another of said directories and wherein each computer having retrieval means also includes:
  (a) first subdirectory retrieval means responsive to input of a directory name to identify a computer having items in at least one subdirectory assigned to that directory; and
  (b) second subdirectory retrieval means connected to receive an address identified by the first subdirectory retrieval means and operable in response thereto to identify further computers having items in at least one subdirectory assigned to the same directory.

17. A computer for use in a distributed computer system, said computer comprising:
  A data store which stores data items, each data item being assigned to one of a plurality of virtual directories;
  at least one node of a virtual network for directory look-up, said node for directory look-up comprising
    (i) data identifying that one of a plurality of the virtual directories with which the node for directory look-up is associated,
    (ii) linking data comprising addresses of other such nodes for directory look-up, and
    (iii) software operable
      (a) in response to an enquiry message that identifies another of the virtual directories forwarding the message to another node for directory look-up of the network, and
      (b) in response to an enquiry message that identifies the virtual directory with which the node for directory look-up is associated, generating a reply message identifying a computer that the node for directory look-up is located on, for each item stored thereon, a node of a virtual network for item look-up said node for item look-up comprising
    (i) data identifying the item with which the node for item look-up is associated,
    (ii) linking data comprising addresses of other such nodes for item look-up each associated with an item assigned to the same virtual directory, whereby said linking data together define a plurality of virtual networks for item look-up, each of which networks corresponds to a respective different virtual directory, and
    (iii) software operable
      (a) in response to an enquiry message that identifies another of the items forwarding the message to another node for item look-up of the network,
      (b) in response to an enquiry message that identifies the item with which the node for item look-up is associated, generating a reply message identifying the computer that the node for item look-up is located on, and
      (c) in response to a request message that identifies the item with which the node for item look-up is associated, generating a reply message including the item, and retrieval means responsive to receipt of a query identifying a directory and an item within that directory to
(i) send to a node of the virtual network for directory took-up an enquiry message identifying the directory,
(ii) upon receipt of a reply message thereto, to send to the computer identified in the reply message an enquiry message identifying the item, and
(iii) upon receipt of a reply message thereto, to send to the computer identified in the reply message a message requesting the item, including also secondary retrieval means operable
(a) upon receipt of a reply message identifying a computer having one or more items in a particular directory to identify further computers having one or more items in that directory, and
(b) to create a list of items in that directory.

18. A computer for use in a distributed computer system, said computer comprising:
a data store which stores data items, each data item being assigned to one of a plurality of virtual directories;
at least one node of a virtual network for directory look-up, said node for directory look-up comprising
(i) data identifying that one of a plurality of the virtual directories with which the node for directory look-up is associated,
(ii) linking data comprising addresses of other such nodes for directory look-up, and
(iii) software operable
(a) in response to an enquiry message that identifies another of the virtual directories forwarding the message to another node for directory look-up of the network, and
(b) in response to an enquiry message that identifies the virtual directory with which the node for directory look-up is associated, generating a reply message identifying a computer that the node for directory look-up is located on; for each item stored thereon, a node of a virtual network for item took-up, said node for item book-up comprising
(i) data identifying the item with which the node for item look-up is associated,
(ii) linking data comprising addresses of other such nodes for item look-up each associated with an item assigned to the same virtual directory, whereby said linking data together define a plurality of virtual networks for item look-up, each of which networks corresponds to a respective different virtual directory, and
(iii) software operable
(a) in response to an enquiry message that identifies another of the items, forwarding the message to another node for item look-up of the network,
(b) in response to an enquiry message that identifies the item with which the node for item look-up is associated, generating a reply message identifying a computer that the node for item look-up is located on; and
(c) in response to a request message that identifies the item with which the node for item took-up is associated, generating a reply message including the item; and
retrieval means responsive to receipt of a query identifying a directory and an item within that directory to
(i) send to a node of the virtual network for directory took-up an enquiry message identifying the directory,
(ii) upon receipt of a reply message thereto, to send to the computer identified in the reply message an enquiry message identifying the item, and
(iii) upon receipt of a reply message thereto, to send to the computer identified in the reply message a message requesting the item,
wherein some of said directories are assigned, as subdirectories, to another of said directories and wherein the computer also includes:
(i) first subdirectory retrieval means responsive to input of a directory name to identify a computer having items in at least one subdirectory assigned to that directory; and
(ii) second subdirectory retrieval means connected to receive an address identified by the first subdirectory retrieval means and operable in response thereto to identify further computers having items in at least one subdirectory assigned to the same directory.

19. A distributed computer system comprising:
a plurality of computers, wherein each computer stores data items, each data item being assigned to one of a plurality of virtual directories, some of said directories being assigned, as subdirectories, to another of said directories;
first retrieval means responsive to input of a directory name to identify a computer having items in at least one subdirectory assigned to the directory whose name is input;
second retrieval means connected to receive an address identified by the first retrieval means and operable in response thereto to identify further computers having items in at least one subdirectory assigned to the directory whose name is input;
wherein each computer having items in at least one subdirectory assigned to a given directory has associated with it a data storage area for containing a list of addresses for other computers having items in at least one subdirectory assigned to the same directory and is responsive to enquiry messages to return a message containing the addresses of the list;
wherein the second retrieval means is operable to send an enquiry message to the computer identified by the first retrieval means and upon receipt of a response to iteratively send enquiry messages to addresses contained in the response to the enquiry message or in a response to a subsequent enquiry message, thereby identifying a plurality of computers having items in subdirectories of the directory in question; and
wherein the first retrieval means is formed by a primary network of virtual nodes, each node being defined by a list of links to other nodes of the primary network, each link in the list including a label and address of a respective other node; and
each node includes (i) means responsive to receipt of a request message containing a label to propagate the request message within the network, and (ii) means responsive to receipt of a request message containing a label matching the label of the node receiving it to generate a reply message.

20. A distributed computer system according to claim 19 in which the retrieval means is operable to compile a composite list of said subdirectories.

* * * * *